United States Patent
Kaufman et al.

(10) Patent No.: US 12,106,225 B2
(45) Date of Patent: Oct. 1, 2024

(54) SYSTEM, METHOD, AND COMPUTER-ACCESSIBLE MEDIUM FOR GENERATING MULTI-CLASS MODELS FROM SINGLE-CLASS DATASETS

(71) Applicant: The Research Foundation for the State University of New York, Albany, NY (US)

(72) Inventors: Arie Kaufman, Plainview, NY (US); Konstantin Dmitriev, Port Jefferson, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 447 days.

(21) Appl. No.: 17/614,702

(22) PCT Filed: May 28, 2020

(86) PCT No.: PCT/US2020/034959
§ 371 (c)(1),
(2) Date: Nov. 29, 2021

(87) PCT Pub. No.: WO2020/243333
PCT Pub. Date: Dec. 3, 2020

(65) Prior Publication Data
US 2022/0237801 A1    Jul. 28, 2022

Related U.S. Application Data

(60) Provisional application No. 62/854,660, filed on May 30, 2019.

(51) Int. Cl.
*G06N 3/088*       (2023.01)
*G06T 7/11*        (2017.01)
(Continued)

(52) U.S. Cl.
CPC ............... *G06N 3/088* (2013.01); *G06T 7/11* (2017.01); *G06V 10/454* (2022.01); *G06V 10/82* (2022.01);
(Continued)

(58) Field of Classification Search
CPC ...... A61B 6/482; G06T 7/143; G06V 10/764; B06V 10/454
See application file for complete search history.

(56) References Cited

U.S. PATENT DOCUMENTS 7,492,938 B2 *   2/2009   Brinson, Jr. .......... G06T 7/0012
                                                 382/128
7,648,460 B2     1/2010   Simopoulos et al.
(Continued)

FOREIGN PATENT DOCUMENTS

CN    104063685 B     9/2014
CN    106600571       4/2017
(Continued)

OTHER PUBLICATIONS

Yao et al., Learning to Diagnose From Scratch by Exploiting Dependencies Among Labels, arXiv:1710.10501v2 [cs.CV] Feb. 1, 2018.
(Continued)

*Primary Examiner* — Yosef Kassa
(74) *Attorney, Agent, or Firm* — ACKnowledge IP, P.C.; Paul Ackerman

(57) ABSTRACT

The exemplary system, method, and computer-accessible medium for generating a multiclass image segmentation model(s) can include receiving multiple single-class image datasets, receiving a target mask for each of the single-class image datasets, receiving a condition of an object associated with each of the single-class image datasets, and generating the multiclass image segmentation model(s) based on the
(Continued)

single-class image datasets, the target masks, and the identification of the target objects. The single-class image datasets can include computer tomography images of abdominal organs. The single-class image datasets can be non-overlapping single-class image datasets. The single-class image datasets can include medical imaging datasets or cityscape datasets. The condition can include (i) an identification of a target object associated with each image in each single-class image dataset, (ii) a classification of each image associated with each single-class image dataset or (iii) an identifiable detail regarding each image in each single-class image datasets.

20 Claims, 12 Drawing Sheets

(51) Int. Cl.
  *G06V 10/44* (2022.01)
  *G06V 10/82* (2022.01)
(52) U.S. Cl.
  CPC ............... *G06T 2207/10081* (2013.01); *G06T 2207/20081* (2013.01); *G06T 2207/20084* (2013.01); *G06T 2207/30004* (2013.01)

(56) References Cited

U.S. PATENT DOCUMENTS

| | | | |
|---|---|---|---|
| 8,073,220 B2 | 12/2011 | Khamene et al. | |
| 8,175,376 B2 | 5/2012 | Marchesotti et al. | |
| 8,442,309 B2 | 5/2013 | Ranganathan | |
| 8,463,360 B2 * | 6/2013 | Yamamoto | A61B 34/20 600/407 |
| 8,538,117 B2 * | 9/2013 | Najarian | G06T 7/0012 600/407 |
| 8,575,554 B2 * | 11/2013 | Qian | A61B 6/037 600/436 |
| 9,035,941 B2 * | 5/2015 | Endo | A61B 8/483 345/419 |
| 9,799,098 B2 | 10/2017 | Seung et al. | |
| 10,453,197 B1 | 10/2019 | Cholakkal et al. | |
| 10,713,569 B2 | 7/2020 | Ros et al. | |
| 10,713,794 B1 | 7/2020 | He et al. | |
| 10,755,112 B2 | 8/2020 | Mabuchi | |
| 10,803,568 B2 * | 10/2020 | Iwase | A61B 3/12 |
| 10,839,211 B2 | 11/2020 | Reinstein et al. | |
| 11,030,738 B2 | 6/2021 | Li et al. | |
| 11,188,783 B2 | 11/2021 | Cricri et al. | |
| 2010/0183217 A1 | 7/2010 | Seung et al. | |
| 2014/0079314 A1 | 3/2014 | Yakubovich et al. | |
| 2014/0270350 A1 | 9/2014 | Rodriguez-Serrano et al. | |
| 2015/0170005 A1 | 6/2015 | Cohen et al. | |
| 2016/0379062 A1 | 12/2016 | Khan et al. | |
| 2017/0351941 A1 | 12/2017 | Mishra et al. | |
| 2018/0315193 A1 | 11/2018 | Paschalakis et al. | |
| 2018/0330198 A1 | 11/2018 | Harary et al. | |
| 2018/0357514 A1 | 12/2018 | Zisimopoulos et al. | |
| 2019/0050625 A1 | 2/2019 | Reinstein et al. | |
| 2019/0080146 A1 | 3/2019 | Santamaria-Pang et al. | |
| 2019/0087726 A1 | 3/2019 | Greenblatt et al. | |
| 2019/0164290 A1 | 5/2019 | Wang et al. | |
| 2019/0205758 A1 | 7/2019 | Zhu et al. | |
| 2019/0311202 A1 | 10/2019 | Lee et al. | |
| 2020/0272822 A1 | 8/2020 | Lin et al. | |
| 2020/0394413 A1 | 12/2020 | Bhanu et al. | |
| 2020/0394459 A1 | 12/2020 | Xu et al. | |
| 2021/0081677 A1 | 3/2021 | Wang et al. | |
| 2021/0097691 A1 | 4/2021 | Liu | |
| 2021/0158043 A1 | 5/2021 | Hou et al. | |
| 2021/0319264 A1 | 10/2021 | Shabtay et al. | |
| 2021/0383171 A1 | 12/2021 | Lee et al. | |

FOREIGN PATENT DOCUMENTS

| | | |
|---|---|---|
| CN | 113420607 A | 1/2018 |
| CN | 108256527 | 7/2018 |
| CN | 108648194 B | 10/2018 |
| CN | 109173263 A | 1/2019 |
| CN | 109360208 | 2/2019 |
| CN | 109360222 B | 2/2019 |
| CN | 109472801 | 3/2019 |
| CN | 109508639 | 3/2019 |
| CN | 110399927 A | 11/2019 |
| CN | 110689037 A | 1/2020 |
| CN | 111161275 A | 5/2020 |
| CN | 111754531 A | 10/2020 |
| CN | 11950693 A | 11/2020 |
| CN | 112215128 A | 1/2021 |
| CN | 112241758 A | 1/2021 |
| CN | 112258436 A | 1/2021 |
| CN | 112258504 A | 1/2021 |
| CN | 112272830 A | 1/2021 |
| CN | 112598676 A | 4/2021 |
| CN | 112861667 A | 5/2021 |
| CN | 112889068 A | 6/2021 |
| CN | 113111684 A | 7/2021 |
| CN | 113255779 A | 8/2021 |
| CN | 113269781 A | 8/2021 |
| CN | 113330490 A | 8/2021 |
| CN | 113378696 A | 9/2021 |
| CN | 113435407 A | 9/2021 |
| CN | 113449606 A | 9/2021 |
| CN | 113554068 A | 10/2021 |
| CN | 113706441 A | 11/2021 |
| CN | 113762266 A | 12/2021 |
| DE | 112016001796 T5 | 1/2018 |
| DE | 102021110051 A1 | 10/2021 |
| EP | 2909793 B1 | 8/2015 |
| EP | 3171297 A1 | 5/2017 |
| EP | 3477591 B1 | 5/2019 |
| EP | 3754560 A1 | 12/2020 |
| EP | 3822865 A1 | 5/2021 |
| EP | 3839822 A1 | 6/2021 |
| IN | 111126346 A | 5/2020 |
| RU | 2654199 | 5/2018 |
| WO | 2008133951 A2 | 11/2008 |
| WO | 2012124000 A1 | 9/2012 |
| WO | 2014205231 A1 | 12/2014 |
| WO | 2017040691 A1 | 3/2017 |
| WO | 2018125580 A1 | 7/2018 |
| WO | 2018200840 A9 | 7/2018 |
| WO | 2018138104 | 8/2018 |
| WO | 2019084697 | 11/2018 |
| WO | 2018229490 A1 | 12/2018 |
| WO | 2020014903 A1 | 1/2020 |
| WO | 2020112188 A1 | 6/2020 |
| WO | 2020112189 A1 | 6/2020 |
| WO | 2020206408 A1 | 10/2020 |
| WO | 2020243333 A1 | 12/2020 |
| WO | 2021005426 A1 | 1/2021 |
| WO | 2021016596 A1 | 1/2021 |
| WO | 2021030629 A1 | 2/2021 |
| WO | 2021041082 A1 | 3/2021 |
| WO | 2021146700 A1 | 7/2021 |
| WO | 2021155246 A9 | 8/2021 |
| WO | 2021188446 A1 | 9/2021 |
| WO | 2021191908 A1 | 9/2021 |
| WO | 2021194490 A1 | 9/2021 |
| WO | 2021226296 A1 | 11/2021 |
| WO | 2021243294 A1 | 12/2021 |
| WO | 2021247746 A1 | 12/2021 |

OTHER PUBLICATIONS

Liu et al., Structured Knowledge Distillation for Semantic Segmentation, CVPR, pp. 2604-2613.

Neven et al., Towards End-to-End Lane Detection: an Instance Segmentation Approach, 2018 IEEE Intelligent Vehicles Symposium, Jun. 2018, pp. 286-291.

(56) References Cited

OTHER PUBLICATIONS

Chartsias et al., Disentangled representation learning in cardiac image analysis, arXiv:1903.09467v4 [cs.CV] Sep. 16, 2019.
Chen et al., Graph Convolutional Networks for Classification with a Structured Label Space, arXiv:1710.04908v2 [cs.LG] Feb. 22, 2018.
Joyce et al., Deep Multi-Class Segmentation Without Ground-Truth Labels.
Dmitriev et al., Learning Multi-Class Segmentations From Single-Class Datasets, IEEE Xplore, pp. 9501-9511.
Li et al., A Multi-label Image Classification Algorithm Based on Attention Model, ICIS 2018, Singapore, pp. 728-731.
Huang et al., Multi-Task Deep Neural Network for Multi-Label Learning, ICIP 2013, pp. 2897-2900.
Huang et al., Scene Labeling using Gated Recurrent Units with Explicit Long Range Conditioning, arXiv:1611.07485v2 [cs.CV] Mar. 28, 2017.
Lanchantin et al., Neural Message Passing for Multi-Label Classification, arXiv:1904.08049v1 [cs.LG] Apr. 17, 2019.
Yang et al., SGM: Sequence Generation Model for Multi-Label Classification, arXiv:1806.04822v3 [cs.CL] Jun. 15, 2018.
Mahmood et al., Deep Adversarial Training for Multi-Organ Nuclei Segmentation in Histopathology Images, arXiv:1810.00236v2 [cs.CV] Oct. 19, 2018.
Ramasinghe et al., A Context-aware Capsule Network for Multi-label Classification, ECCV 2018.

\* cited by examiner

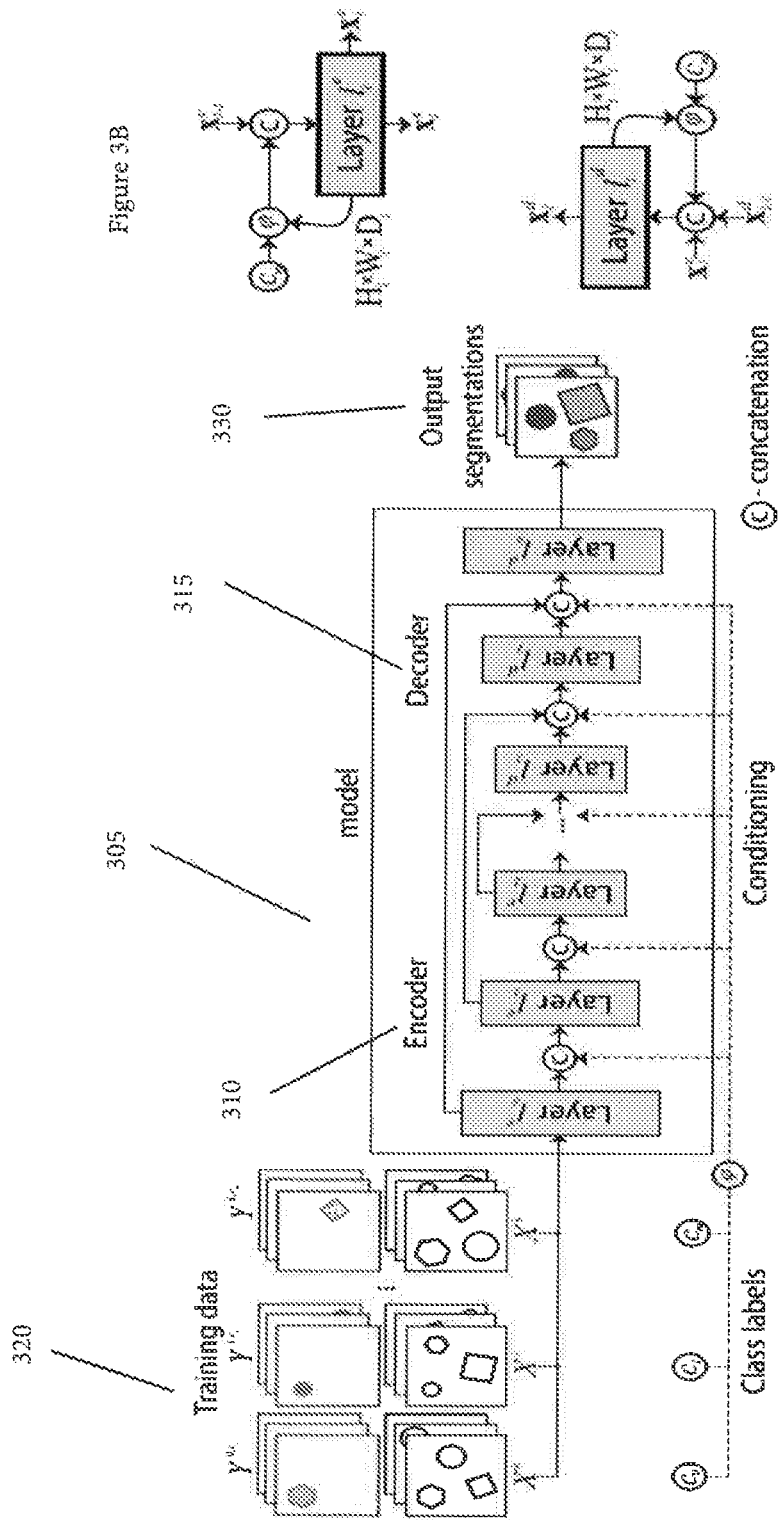

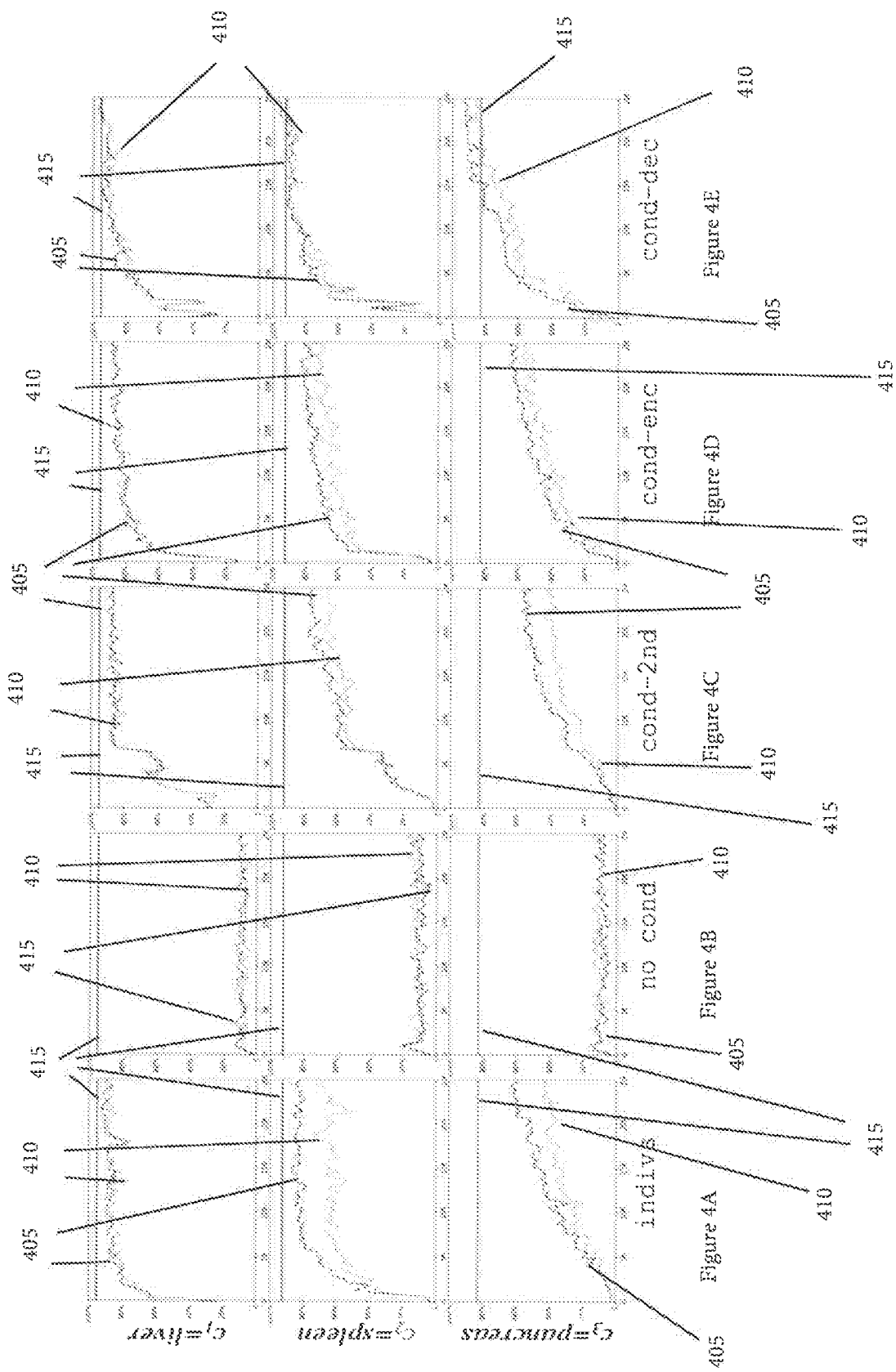

SYSTEM, METHOD, AND COMPUTER-ACCESSIBLE MEDIUM FOR GENERATING MULTI-CLASS MODELS FROM SINGLE-CLASS DATASETS

CROSS-REFERENCE TO RELATED APPLICATION(S)

This application relates to and claims priority from U.S. Patent Application No. 62/854,660, filed on May 30, 2019, the entire disclosure of which is incorporated herein by reference.

STATEMENT REGARDING FEDERALLY SPONSORED RESEARCH

This invention was made with government support under Grant No. HL 127522, awarded by the National Institutes of Health. The government has certain rights in the invention.

FIELD OF THE DISCLOSURE

The present disclosure relates generally to image segmentation, and more specifically, to exemplary embodiments of an exemplary system, method, and computer-accessible medium for multi-class segmentations from single-class datasets.

BACKGROUND INFORMATION

One area of significant interest in the field of image processing is segmentation, a process in which objects of interest in an image are automatically identified. Progress has been made in deep learning for semantic segmentation of images, and one of the major factors of such advances is the public availability of large-scale multi-class datasets, such as ImageNet (see, e.g., Reference 7), COCO (see, e.g., Reference 24), PASCAL VOC (see, e.g., Reference 12), and others. Such variety of available datasets not only provides the means to train and evaluate different segmentation models but also to exhibit diverse labels. However, in contrast to natural images, there are certain domains where despite the critical importance of segmentation research, the generation of ground truth annotations and labeling is extremely costly and remains a bottleneck in advancing research.

Biomedical images is one such domain where the accurate segmentation of various structures is a fundamental problem, especially in clinical research. In traditional clinical practice, segmentation is often omitted during the diagnostic process. However, manual analysis of biomedical images, including measurements, is subject to large variability, as it depends on different factors, including the structure of interest, image quality, and the clinician's experience. Moreover, segmentation is an essential component in various medical systems that support computer-aided diagnosis ("CAD") (see, e.g., References 9 and 14), and surgery and treatment planning. Furthermore, early cancer detection and staging often depend on the results of segmentation.

Remarkable progress has been made in the segmentation of radiological images, such as magnetic resonance imaging ("MRI") and computed tomography ("CT") 3D scans. Radiological images exhibit various objects, such as abdominal organs (see e.g., FIG. 1A), within a single image. However, creating expert annotations for such images is a time consuming and intensive task, and thus multi-class datasets (e.g., datasets in which multiple objects are labeled in each of the images as illustrated in FIG. 1A) are difficult to generate. A limited number of segmentation algorithms have been proposed and evaluated on multi-class datasets. These include private or public datasets, such as VISCERAL (see, e.g., Reference 20), which has been unavailable due to a lack of funding. Apart from often being private, these multi-class datasets are frequently limited in size (e.g., less than 30 volumes) and come from a single institution, where they were generated using the same imaging protocols and imaging devices, leading to the developed segmentation algorithms being sensitive to such imaging parameters. On the other hand, generation of single-class datasets (e.g., a single object of interest is identified in the training data) requires less time and effort, and they are often publicly available as part of challenges, such as, Sliver07 (see, e.g., Reference 15; and FIG. 1B) and NIH Pancreas. (See, e.g., Reference 16; and FIG. 1C). Additionally, these single-class datasets come from different institutions and exhibit variability in factors, such as the presence of malignancy, imaging protocols, and reconstruction algorithms. FIG. 1D shows an image of liver and spleen segmentations. While being the same in nature, the sets of images in these datasets do not overlap, which complicates their simultaneous use for training.

However, while single-class datasets often contain the same objects within a single image, the ground truth annotations are provided for only a particular class of objects in the form of binary masks, and the sets of images from different datasets do not overlap. Thus, it is obstructive to simply combine the datasets to train a single model for multi-class segmentation. Classically, single-class datasets have been used to develop highly tailored solutions for the segmentation of particular classes.

Conditioning has been widely used in image synthesis. Conditioning can include providing some identifiable information regarding the image (e.g., an identification of one or more targets within an image, an identification of the origin of the image, etc.). Work has been performed on generating images conditioned on certain attributes, such as category or labels. (See, e.g., References 23, 38, 42 and 43). Additionally, a framework has been proposed for person image synthesis based in arbitrary poses. (See, e.g., Reference 26). A distribution of potential results of the image-to-image translation has been modelled. (See, e.g., Reference 49). The synthesis of images given the desired content and its location within the image has also been demonstrated. (See, e.g., Reference 32). However, the area of conditional convolutional neural networks ("convnets") for semantic segmentation of images has not been explored.

Additionally, it can be difficult to collect large-scale, carefully annotated datasets for semantic segmentation. (See, e.g., References 37, 39 and 46). Various approaches have been proposed for learning to perform segmentation using weakly labeled data. Weak annotations, in the form of image labels (see, e.g., Reference 22), points and scribbles (see, e.g., References 1 and 18), bounding boxes (see, e.g., Reference 6), and their combinations (see, e.g., References 30 and 41), have been explored for learning image segmentation models. Weakly-supervised segmentation still assumes the availability of annotations of every object from a collection of pre-defined target classes if one is present in an image. With regard to CT images, each slice would require a set of annotations for every target organ present on a slice, be it seeds, bounding boxes or labels. However, single-class datasets do not come with such annotations, and provide details for only one particular class.

Segmentation of anatomical structures, especially abdominal organs, can be a difficult problem, as the organs may demonstrate a high variability in size, position, and shape. (See e.g., FIGS. 1A-1D). Various convnet-based segmentation methods have been proposed for abdominal organ segmentation. The majority of these methods that utilize single-class datasets are specialized on the segmentation of a particular organ, such as liver (see, e.g., References 10 and 25), or pancreas. (See, e.g., References 13 and 34). Moreover, these works often describe sophisticated and intricate multi-stage approaches. (See, e.g., Reference 45). Some more generally applicable convnet-based methods have been proposed and tested on multiple organs. (See, e.g., Reference 11). These methods describe models for the segmentation of individual organs, and the separate segmentations are fused together to produce the final outlines. However, these models must be trained and applied separately for the segmentation of each organ, resulting in inefficient usage of computational resources and additional training time. Moreover, such separately trained single-class models do not embed the spatial correlations among different abdominal organs, and thus are likely to be overfitted for each particular single-class dataset. Additionally, these models often also require pre- and post-processing steps, which complicate and particularize the models even more.

Several studies have been proposed for the simultaneous multi-class, or multi-organ, segmentation of anatomical structures in medical images. The majority of these utilize probabilistic atlases (see, e.g., References 4, 29 and 40), and statistical shape models. (See, e.g., Reference 28). These methods require all volumetric images in the training dataset to be registered. This pre-processing step can be computationally expensive and often imperfect due to the considerable variations in size, shape, and location of abdominal organs between patients. Recently, a few convnet-based solutions (see, e.g., Reference 35), were proposed for simultaneous multi-organ segmentation. However, all such methods were developed and evaluated on publicly unavailable multi-class segmentation datasets. Moreover, the multi-class datasets that were used were acquired by a single institution and exhibit the same image quality and lack chronic abnormalities. In contrast, diverse single-class datasets can be leveraged, and conditioning of a convnet can be used to develop a multi-class segmentation model of high generalization ability.

Thus, it may be beneficial to provide an exemplary system, method, and computer-accessible medium for multi-class segmentations from single-class datasets which can overcome at least some of the deficiencies described herein above.

SUMMARY OF EXEMPLARY EMBODIMENTS

The exemplary system, method, and computer-accessible medium for generating a multiclass image segmentation model(s) can include receiving multiple single-class image datasets, receiving a target mask for each of the single-class image datasets, receiving a condition of an object associated with each of the single-class image datasets, and generating the multiclass image segmentation model(s) based on the single-class image datasets, the target masks, and the identification of the target objects. The single-class image datasets can include computer tomography images of abdominal organs. The single-class image datasets can be non-overlapping single-class image datasets. The single-class image datasets can include medical imaging datasets or cityscape datasets. The condition can include (i) an identification of a target object associated with each image in each single-class image dataset, (ii) a classification of each image associated with each single-class image dataset or (iii) an identifiable detail regarding each image in each single-class image datasets.

In some exemplary embodiments of the present disclosure, the target mask can be a segmentation mask. The multiclass image segmentation model(s) can be generated using a convolutional neural network(s) ("CNN"). The multiclass image segmentation model(s) can be generated using the condition as an input into the CNN(s). The multiclass image segmentation model(s) can be generated using the condition in an encoder stage of the CNN(s). The encoder can include (i) a convolutional layer(s) and (ii) at least six DenseBlock+MaxPooling layers. A number of feature channels in each of the DenseBlock+MaxPooling layers can be proportional to a depth of each of the DenseBlock+MaxPooling layers. The multiclass image segmentation model(s) can be generated using the condition in a decoder stage of the CNN(s). The decoder can include (i) at least two convolutional layers and (ii) at least six Transposed Convolutions+DenseBlock layers. The Transposed Convolutions can include strides as upsampling layers.

In certain exemplary embodiments of the present disclosure, the CNN(s) can include a skip connection(s). The multiclass image segmentation model(s) can be generated by training the multiclass image segmentation model(s) separately on (i) each class of the single-class image datasets, (ii) the target mask associated with each of the single-class image datasets, and (iii) the condition associated with each of the single-class image datasets. The condition can be obtained from a lookup table containing an entry for each of the single-class image datasets. A further single-class image dataset can be received, a further target mask for the further single-class image dataset can be received, a further condition associated with the further single-class image dataset can be received, and the multiclass image segmentation model(s) can be updated based on the further single-class image dataset, the further target mask, and the further condition.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 3A is a schematic diagram of a convolutional neural network ("convnet") model according to an exemplary embodiment of the present disclosure;

FIG. 3B is a schematic diagram further illustrating an exemplary encoder layer for the convent of FIG. 3A according to an embodiment of the present disclosure;

FIG. 3C is a schematic diagram further illustrating an exemplary decoder layer for the convent of FIG. 3A according to an embodiment of the present disclosure;

FIGS. 4A-4E are graphs illustrating training curves for various condition models according to an exemplary embodiment of the present disclosure;

Figure 1A:
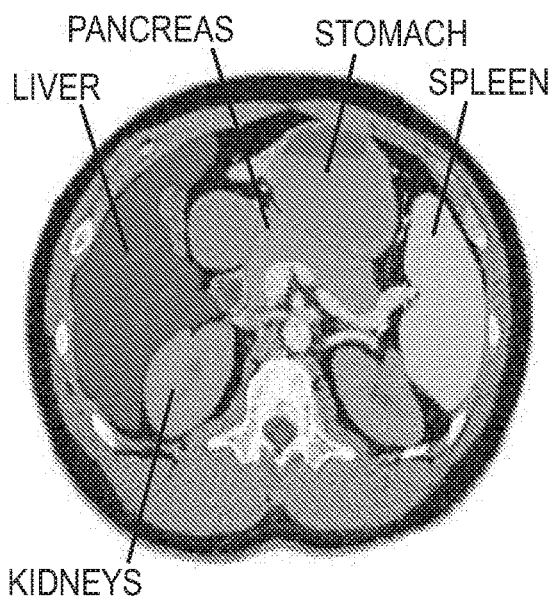
FIG. 1A is a 2D abdominal image slice manually annotated with the outlines of each organ.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

The exemplary system, method and computer-accessible medium, according to an exemplary embodiment of the present disclosure, can utilize a single convolutional network ("convnet") for multi-class segmentation using non-overlapping single-class datasets for training by conditioning the neural network. Conditioning can include an identification of the target object to be segmented. For example, when training a model to identify a liver, a spleen, and a pancreas, the model can be training on multiple single-class images (e.g., images having only one of the objects identified) for each target object, along with an identification of the specific target object present in a particular image. The exemplary system, method and computer-accessible medium can share implicitly all of its parameters by all target classes being modeled. This can drive the exemplary system, method and computer-accessible medium to effectively learn the spatial connections between objects of different classes and improve its generalization ability.

A system, method and computer-accessible medium, according to an exemplary embodiment of the present disclosure, can condition a convnet for segmentation and can produce multi-class segmentations using a single model trained on non-overlapping single-class datasets. The exemplary conditioning facilitates an efficient multi-class segmentation with a single model trained on single-class datasets, drastically reducing the training complexity and the total number of parameters, in comparison to separate class-specific models. The exemplary system, method and computer-accessible medium can also provide improved state-of-the-art results, up to a 2.7% improvement over the state of the art, on publicly available datasets for the segmentation of liver, spleen, and pancreas with significantly reduced computational cost. Additionally, the present system, method and computer-accessible medium can be applied to segment various image types and applications, such as natural images, and can be used to evaluate, for example, Cityscapes datasets. (See, e.g., Reference 5).

Figure 2:
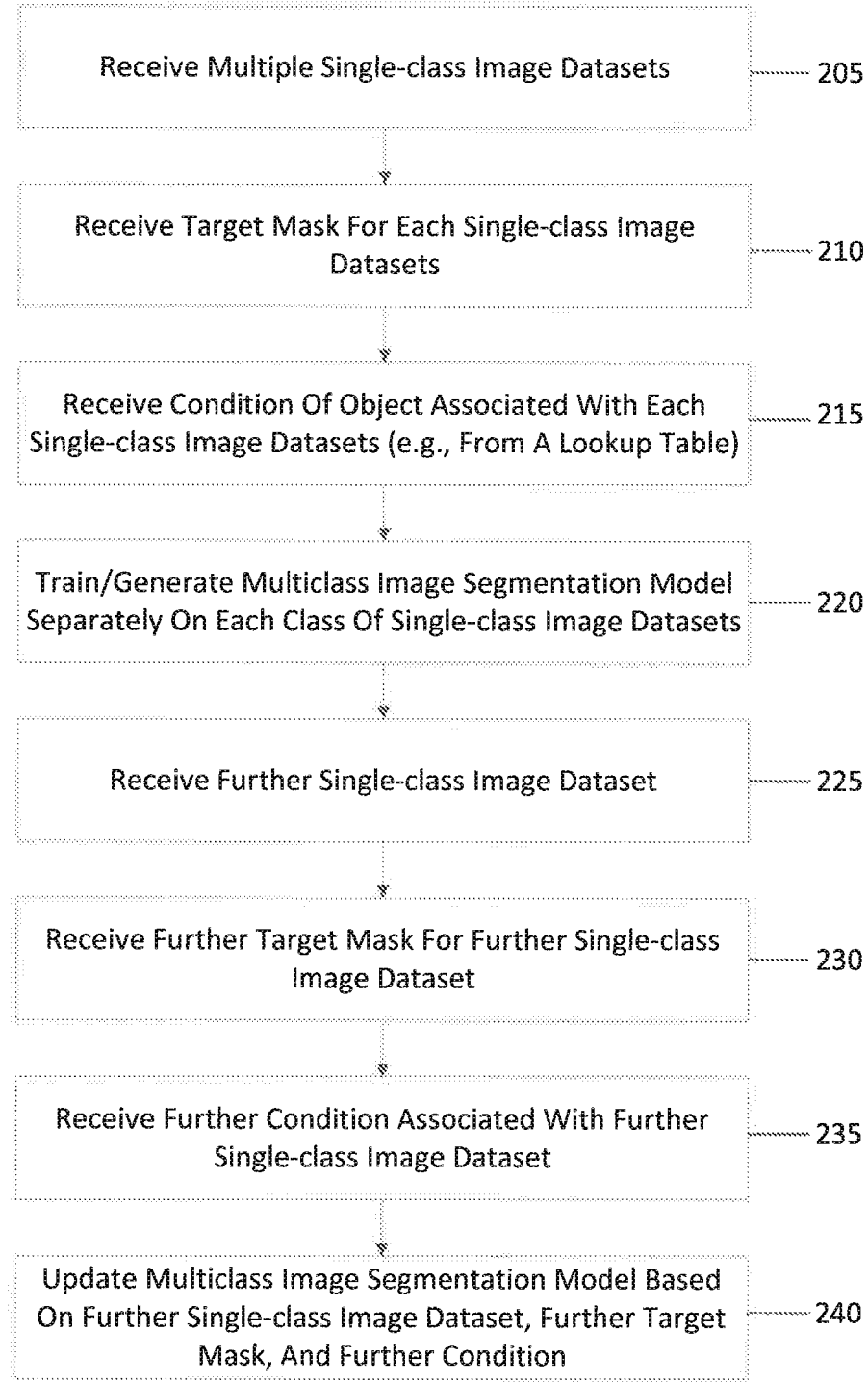
FIG. 2 is a flow diagram of a method for generating a multiclass image segmentation model according to an exemplary embodiment of the present disclosure.

FIG. 2 is a flow diagram of a method 200 for generating a multiclass image segmentation model. For example, at procedure 205, multiple single-class image datasets can be received. The single-class image datasets can be medical image datasets, cityscape datasets, or any other suitable image datasets of interest. At procedure 210, a target mask for each of the single-class image datasets can be received. At procedure 215, a condition of an object associated with each of the single-class image datasets can be received (e.g., from a lookup table). The condition can include an identification of a target object in each image in each single-class image dataset, a prior classification of each image in each single-class image dataset, or any identifiable information about each image in each single-class image dataset. At procedure 220, the multiclass image segmentation model can be separately trained/generated on each class of the single-class image datasets. Various suitable neural network can be used to implement the present multiclass image segmentation model, as described herein below. At procedure 225, a further single-class image dataset can be received. The further single-class image dataset can include a single further single-class image dataset or multiple further single-class image datasets. At procedure 230, a further target mask for the further single-class image dataset can be received. At procedure 235, a further condition associated with the further single-class image dataset can be received (e.g., from the same or a different lookup table). At procedure 240, the multiclass image segmentation model can be updated (e.g., retrained) based on the further single-class image dataset, the further target mask, and the further condition. Thus, the multiclass image segmentation model can be updated only on the new single-class image dataset, without the need for the original single-class image datasets that were used to originally train the model.

Exemplary Method

As opposed to generating and overlaying separate models for each object in single-class datasets, the present system, method and computer-accessible medium for multi-class image segmentation can simultaneously learn multi-class knowledge given a set of single-class datasets. Consider a set of single-class datasets $\{D_1, \ldots, D_K\}$, where each dataset $D_k = \{(X^k; Y^{k,c_m})\}$, $k \in \{1, \ldots, K\}$ contains a set of input images $X^k = \{x_i^k\}$ and a set of corresponding binary segmentation masks $Y^{k,c_m} = \{y_i^{k,c_m}\}$ of object $C_m \in C$, m=1, ..., M. Additionally, input images $X^k$ in each dataset $D_k$ exhibit objects of all classes $C_m \in C$. Moreover, it can also be assumed that datasets $D_k$ do not have the same pairs of $\{(X^k; Y^{k,c_m})\}$, such as $D_i \cap D_j = \emptyset$, $\forall i, j$, and each dataset might have different number of classes. These assumptions greatly relax the initial conditions and attempt to make the description of the problem more general and challenging. The exemplary system, method and computer-accessible medium can then be used to predict a set of segmentation masks $\{\hat{y}^{c_m}\}$, $\forall C_m \in C$, given an unseen input image $\hat{x}$.

Exemplary Model

Figure 3D:
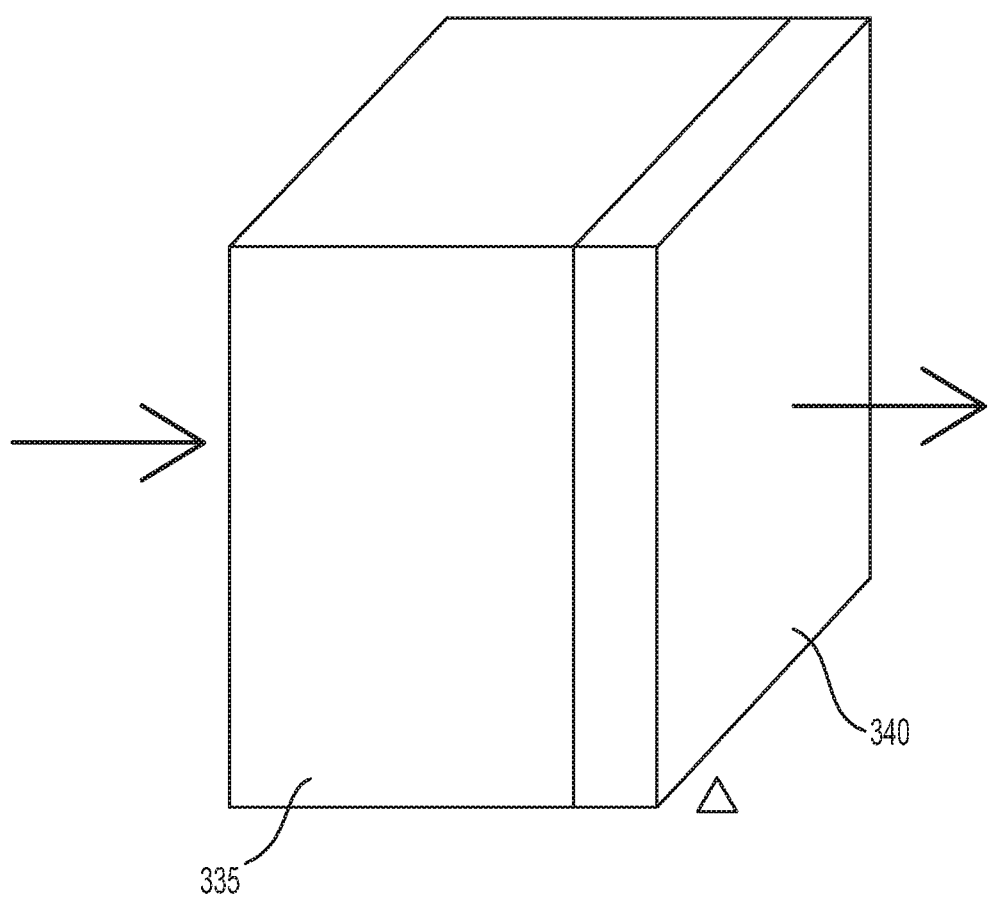
FIG. 3D shows a schematic diagram of the conditioning used in the exemplary neural network shown in FIG. 3A according to an exemplary embodiment of the present disclosure.

As shown in FIG. 3A, the exemplary system, method and computer-accessible medium 305, according to one possible embodiment of the present disclosure, can be used for conditioning a convnet to perform multi-class segmentation using only single-class datasets during training. A fully-convolutional U-net-like architecture (e.g., two-dimensional or three-dimensional) can be utilized, which can include an encoder 310 and a decoder 315, with skip connections. The exemplary machine learning model 305, can receive training data 320 as an input, along with class labels 325, which can be used to identify the objects in training data 320. The exemplary model 305 can then generate output segmentations 330, which can include the segmentation of one or more objects in an image. As shown in FIG. 3A, 3D densely connected convolutional blocks can be adopted (see, e.g., References 17 and 19), which can utilize the imaging information (e.g., volumetric information) available in a plurality of images (e.g., CT scans). The model employed in one exemplary embodiment of the system, method and computer-accessible medium can include densely-connected units of a composite function $F_l(\cdot)$, and the output $x_l$ of the $l^{th}$ layer can be defined as, for example:

$$x_l = F_l([x_0, x_1, \ldots, x_{l-1}]), \quad (1)$$

where [ ... ] can be a concatenation operation of the feature maps from previous layers. In the exemplary experiments $F_l(\cdot)$ can be defined as a leaky rectified linear unit ("LReLU") (see, e.g., Reference 27), with $\alpha=0.3$, followed by a 3×3×3 convolution. Encoder 310 can include a convolutional layer, followed by six densely connected convolutional blocks, sequentially connected via 2×2×2 maxpooling layers. The number of feature channels in each dense block can be proportional to its depth. The number of feature channels can be an arbitrarily determined number. Alternatively, the number of feature channels can double with each new layer in the neural network. Decoder 315 can utilize transposed convolutions with strides as upsampling layers and can be topologically symmetric to encoder 310. The last convolutional layer can end with a sigmoid function, which can be used to generate a probability map.

It will be appreciated that there are numerous machine learning models available to those skilled in the art and that the exemplary convnet model 205 described herein is but one acceptable model. Other models may be suitable for use in practicing the present segmentation systems and methods in accordance with the present teachings.

Exemplary Conditioning

Unlike classic approaches of training separate models for each class $c_m \in C$, the exemplary system, method and computer-accessible medium can infer (e.g., determine or predict) the segmentations and the relationships of multiple classes from single-class datasets and learn to generate segmentations for all classes $c_m$ with a single model. The segmentations can be generated for all classes in any order, which can be randomly selected. To introduce such ability to the exemplary model, conditioning the base convolutional model with a target class $c_m$ that needs to be segmented can be performed.

An exemplary goal was to keep the base model fully-convolutional, simple, and efficient in order to avoid additional overhead that could negatively affect the performance. To achieve this, the conditional information can be incorporated as a part of the intermediate activation signal after performing convolutional operations and before applying nonlinearities. While some examples of conditioned generative adversarial nets ("GANs") (see, e.g., Reference 32) suggest to learn the conditional function, a more computationally efficient approach can be used for the task of segmentation. Specifically, the following exemplary function can be used:

$$\varphi(c_m, H_j, W_j, D_j) = O^{H_j \times W_j \times D_j} \odot \mathrm{hash}(c_m), \quad (2)$$

where $\odot$ can be an element-wise multiplication, $O^{H_j \times W_j \times D_j}$ can be a tensor of size $H_j \times W_j \times D_j$ with all elements set to 1, and hash(•) can be a hash function for a pre-defined lookup table. That can be, the function $\varphi$ ($c_m$, $H_j \times W_j \times D_j$) creates a tensor of size $H_j \times W_j \times D_j$, with all values set to hash($c_m$). Therefore, the exemplary conditioning of the $l^{th}$ layer with input $x_l$ of size $H_l \times W_l \times D_l$ can be defined as, for example:

$$x_l = [x_{l-1}, \varphi(c_m, H_l, W_l, D_l)] \quad (3)$$

where $x_{l-1}$ can be the output of the previous layer. (See e.g., FIGS. 3B and 3C). Additionally, the exemplary conditioning does not depend on the possible attributes of the classes, such as location, shape, etc. It can be used to increase the generalization ability of the exemplary system, method and computer-accessible medium.

During training time, the network can be trained on pairs $(x_i^k; \mathcal{Y}_i^{k,c_m})$ that can be randomly sampled from different datasets $D_k$, while being conditioned on the corresponding class $c_m$ of the binary ground truth segmentation mask $\mathcal{Y}_i^{k,c_m}$. For example, network training can be based on images from different datasets along with a condition associated with each image. The condition can include target information if a segmentation is being performed (e.g., an identification of the object in the specific image used for training) or some identifying information relate to the image if a classification is being performed. During the inference time, the network can be sequentially conditioned on all $c_m \in C$ to generate segmentations masks $\{\hat{y}^{c_m}\}$ for all objects in the input image $\hat{x}$. While such an approach of using a pre-defined lookup table maintains the simplicity and austerity of the exemplary system, method and computer-accessible medium without additional variables to be trained, it also has some practical benefits. In particular, in the event of adding a new target segmentation class $c_{M+1}$, the exemplary system, method and computer-accessible medium may only need to utilize a new entry to the lookup table and a simple fine-tuning, unlike the more expensive re-training that can be expected if a conditional function had been used. Alternatively, instead of using a predefined lookup table, the order can be manually selected based on the classes.

Conditioning can be performed at various locations in the model. FIG. 3D shows a schematic diagram of the conditioning used in the exemplary model shown in FIG. 3A. In particular, FIG. 3D illustrates activation maps 335 and conditional tensor 340 used for conditioning. As shown in FIG. 3A, conditioning can be performed along with the data input, at the encoder 310, or at the decoder 315. If conditioning is performed at the decoder 315 (e.g., the layers in the decoder), the provided conditional information can be used along with the low-level information present in the encoder feature maps to map them to higher levels within the network. Thus, the conditional information can be directly accessible to multiple layers, which can facilitate easier and/or superior optimization.

Exemplary Experiments

The exemplary system, method and computer-accessible medium was tested with different kinds of loss functions and various methods of conditioning, and the results were compared to the solutions, which were individually customized for each single-class dataset or designed for multi-class datasets. The conditioned multi-class segmentation, as described herein, outperformed state-of-the-art single-class segmentation approaches for biomedical images.

Figure 1B:
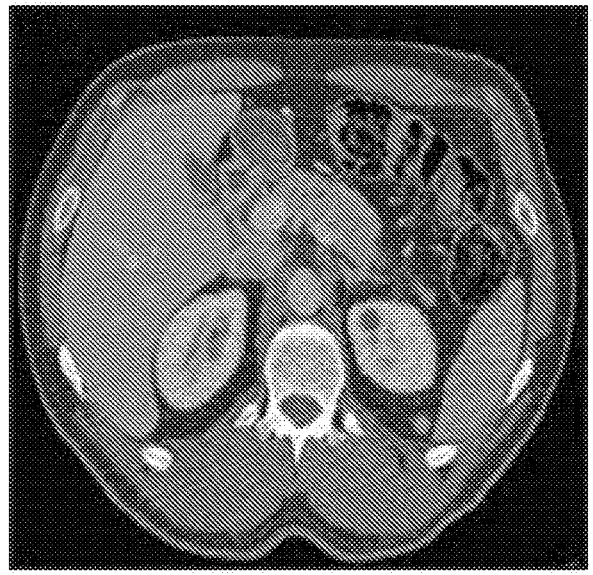
FIG. 1B is an image of a single-class liver segmentation according to an exemplary embodiment of the present disclosure.
Figure 1C:
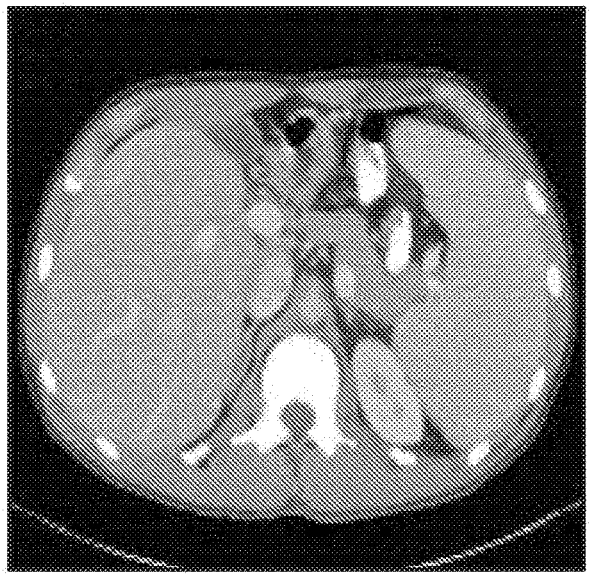
FIG. 1C is an image of a single-class pancreas segmentation according to an exemplary embodiment of the present disclosure.
Figure 1D:
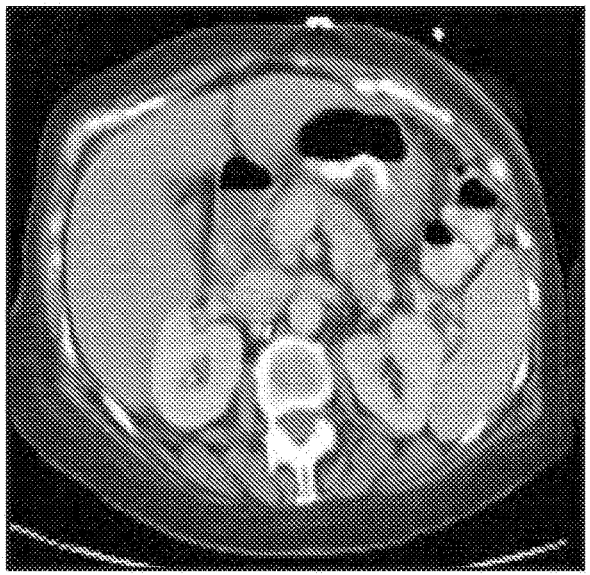
FIG. 1D is an image of liver and spleen segmentations according to an exemplary embodiment of the present disclosure.

Exemplary Datasets: To evaluate the exemplary system, method and computer-accessible medium, three datasets of abdominal CT volumes were utilized. In particular, volumes of the publicly available Sliver07 dataset (see, e.g., Reference 15) of liver segmentations, 82 volumes of the publicly available NIH Pancreas dataset (see, e.g., Reference 16) of pancreas segmentations, and 74 volumes from an additional dataset of liver and spleen segmentations were used. In the exemplary experiments, $c_m \in C = \{$liver, spleen, pancreas$\}$. The segmentation masks in the latter dataset have been binarized and stored as separate single-class files. Examples of the CT images and the corresponding ground-truth segmentation masks are illustrated in FIGS. 1B-1D and column 605 shown in FIG. 6. Each dataset was divided into training and testing sets with ratio of 80/20. The size of the volumes in each dataset was $512 \times 512 \times Z_0$, where $Z_0$, where $Z_0$ can be the number of axial slices. Each dataset was collected at different institutions with different scanners and protocols, and incorporates volumes of various inter-slice spacings and, moreover, exhibits various pathologies, such as hepatic tumors and cases of splenomegaly. Such diversity in the datasets facilitates the testing in a challenging setting.

The input images have been minimally preprocessed: each dataset was sampled with an equal probability, and subvolumes of size $256 \times 256 \times 32$ have been extracted and normalized to create input images. Additionally, all training examples have been augmented with small random rotations, zooms, and shifts.

Exemplary Training: the exemplary system, method and computer-accessible medium, according to an exemplary embodiment of the present disclosure, was trained on examples from all used single-class datasets. It was optimized with the following objective:

$$\mathcal{L}(Y, \hat{Y}) = \alpha_1 \beta_1 \mathcal{L}_1(Y^{c_1}, \hat{Y}^{c_1}) + \ldots + \alpha_n \beta_k \mathcal{L}_k(Y^{c_m}, \hat{Y}^{c_m}), \quad (4)$$

where $\mathcal{L}_i(Y^{c_i}, \hat{Y}^{c_i})$ can be a loss function for a single-class dataset $D_i$, the hyperparameters $\alpha_i$, specify the impact of a particular class $c_i$ on the total loss, and $\beta_i = \{0, 1\}$ specifies the presence of the binary mask for class $c_i$ in the batch.

Exemplary Inference: During the inference time (e.g., the time when the segmentation is determined or predicted), the target segmentation class $c_i$ can be manually specified. However, to simplify the use of the exemplary system, method and computer-accessible medium during the inference time, the process of specifying the target segmentation class can be automated by iteratively going through all the entities in the lookup table. Alternatively, specifically for segmentation of abdominal organs, a set of presets can be defined, such as liver and gallbladder, which can be gathered by clinicians.

Exemplary Implementation: the exemplary system, method and computer-accessible medium was implemented using Keras library with TensorFlow backend. The exemplary network was trained from scratch using Adam optimizer (see, e.g., Reference 21), with the initial learning rate or 0.00005, and $\beta_1 = 0.9$, $\beta_2 = 0.999$, with a batch size of 2 for 25K iterations.

Exemplary Ablation Experiments

The probability map can be binarized by thresholding them at 0.5 to generate the segmentation mask. Other suitable thresholding values (e.g., above or below 0.5) can be used based on the desired sensitivity or specificity. To measure the similarity between binary segmentation masks Y and $\hat{Y}$, the common Dice Similarity Coefficient ("DSC") metric was used, which can be defined as $$DSC(Y, \hat{Y}) = \frac{2 \Sigma Y \odot \hat{Y}}{\Sigma Y + \Sigma Y}.$$

The results were compared against the current state-of-the-art segmentation methods, which are proposed specifically for single-class segmentation, and can be tailored for a particular class only. In particular, the results were compared against a two-step coarse-to-fine convnet-based solution for pancreas segmentation, and yielded 82.4% DSC on the NIH Pancreas. (See, e.g., References 16 and 48). The exemplary system, method and computer-accessible medium was also compared to another convnet-based segmentation (see, e.g., Reference 44), which showed 95% DSC on a private datasets of 1000 CT images of liver. Additionally, the results were compared against a two-stage coarse-to-fine multi-organ convnet-based solution (see, e.g., Reference 35), which was evaluated on a private multi-class dataset and resulted in 95.4%, 92.8%, and 82.2% DSC for liver, spleen, and pancreas, respectively.

In all experiments described below, $\alpha_i = 1$ and the following DSC-based loss function was used:

$$\mathcal{L}_i(Y^{c_i}, \hat{Y}^{c_i}) = 1 - \frac{2 \Sigma Y^{c_i} \odot \hat{Y}^{c_i}}{\Sigma Y^{c_i} + \Sigma \hat{Y}^{c_i}}. \quad (5)$$

FIGS. 4A-4E are graphs illustrating training curves for various condition models according to an exemplary embodiment of the present disclosure. Training curves of various condition models generated for each $c_m \in C$=liver, spleen, pancreas during the first 25 k iterations (e.g., x-axis). Dashed lines 405 denote training accuracy ("DSC", %), (e.g., y-axis), the solid lines 410 denote testing accuracy, and the solid lines 415 denote the current state-of-the-art results Binary cross-entropy loss function was tested, which showed significantly worse performance. Experiments were performed by analyzing the performance of an exemplary model trained separately for each class $c_m$ without the use of conditioning. This can be referred as indivs. Channels for each for each class $c_m$ (e.g., such as liver, spleen, and pancreas) are illustrated in the graphs shown in FIG. 4A. It was observed that the non-conditioned models failed to get close to the state-of-the-art performance during the first 25K iterations.

Figure 5:
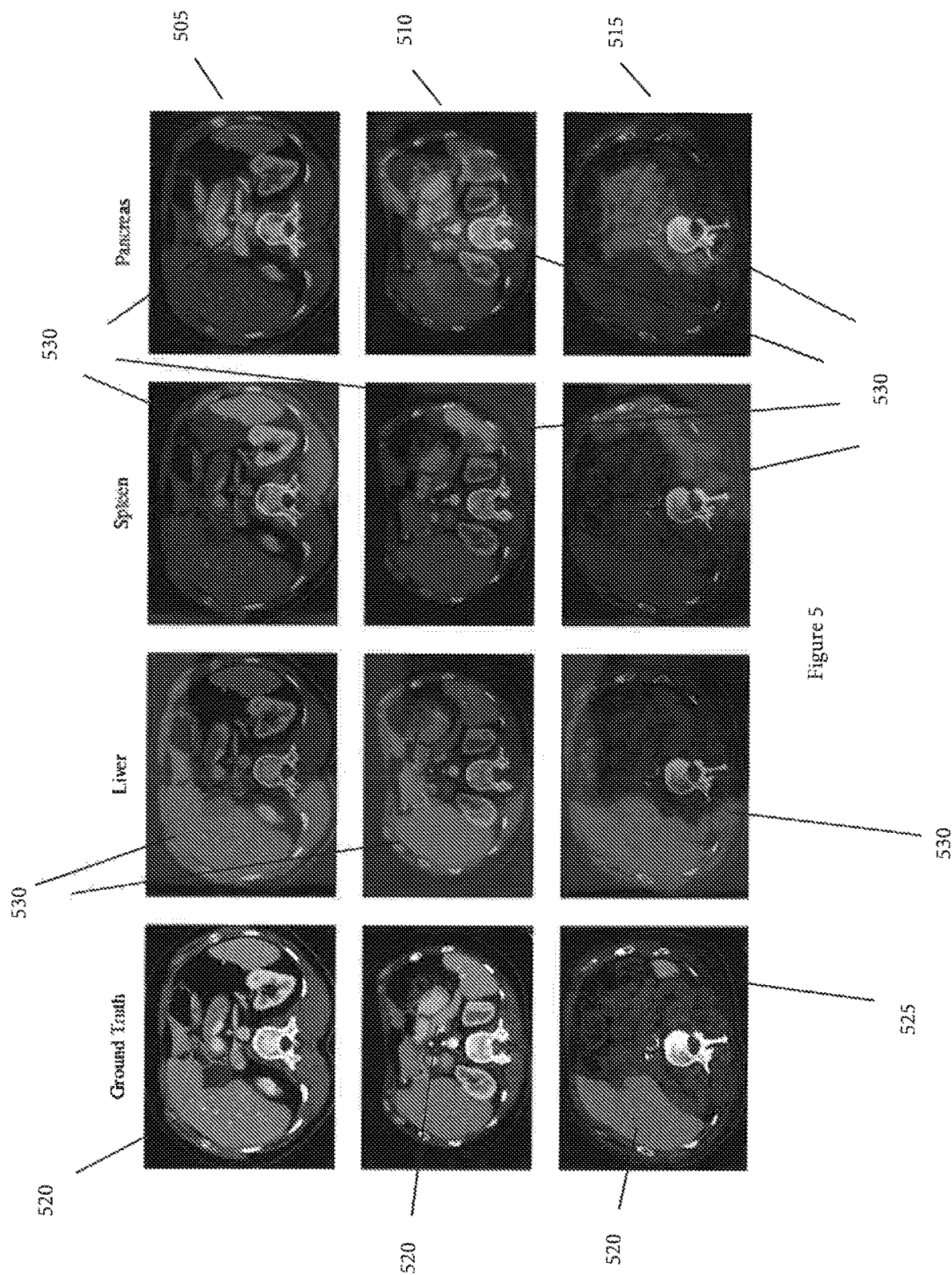
FIG. 5 is a set of segmentation predictions for CT images from different testing sites according to an exemplary embodiment of the present disclosure.

A naive approach of training a single model on single-class datasets was examined to produce reasonable multi-class segmentation results by predicting a volume of the same dimensions but with three additional channels for liver, spleen, and pancreas. This can referred to as no cond and the learning curves are illustrated in the graphs shown in FIG. 4B. The results show that the training does not converge, which was expected, and can be explained by the fact that the model may have difficulties inferring multi-class segmentations from the inconsistent binary masks in the training examples. Additionally, this approach can be memory-bounded, especially for high-resolution images and volumes, and only a small number of classes can be modeled this way. The examples of the segmentations produced by the no cond model are shown in the images in FIG. 5 for ground truth, liver, spleen, and pancreas. The results are presented in 2D for illustrative purposes, but actual results are in 3D. Row 505 was produced with the Sliver07 [1] dataset, row 510 was produced using NIH Pancreas dataset, and row 515 was produced using an exemplary additional dataset of liver and spleen segmentations. Available ground truth are outlined in the datasets (e.g., areas 520 and 525), and segmentation results conditioned on each $c_m \in C=\{$liver, spleen, pancreas$\}$ are shown as elements 530. Although the segmentation outlines for the additional dataset are shown together (e.g., areas 520 and 525), they were generated and stored separately in a form of binary masks.

The next experiments describe the results of the conditioned model. In the experiment cond-2nd, conditioning a model by providing the conditional information as the second channel of the input volume was examined. (See e.g., graphs shown in FIG. 4C) Particularly, a lookup table of conditioning variables was defined for each $c_m$ with random real values sampled from [−1, 1]. Specifically, each training 3D subvolume was augmented in the second channel with a volume of the same size with all elements set to hash($c_m$). The learning curves illustrated in FIG. 4C show that the model utilized the provided conditional information and learned to generate multi-class segmentations. However, similarly to the experiment cond-enc (see e.g., graphs shown in FIG. 4D), where each dense block in the encoder had direct access to the conditional information, cond-$2^{nd}$ shows adequate performance but struggles to outperform state-of-the-art approaches. However, significantly better generalization performance in these models trained jointly on different datasets was determined while improving training and testing accuracies, compared to indivs models trained separately on each dataset.

Figure 6:
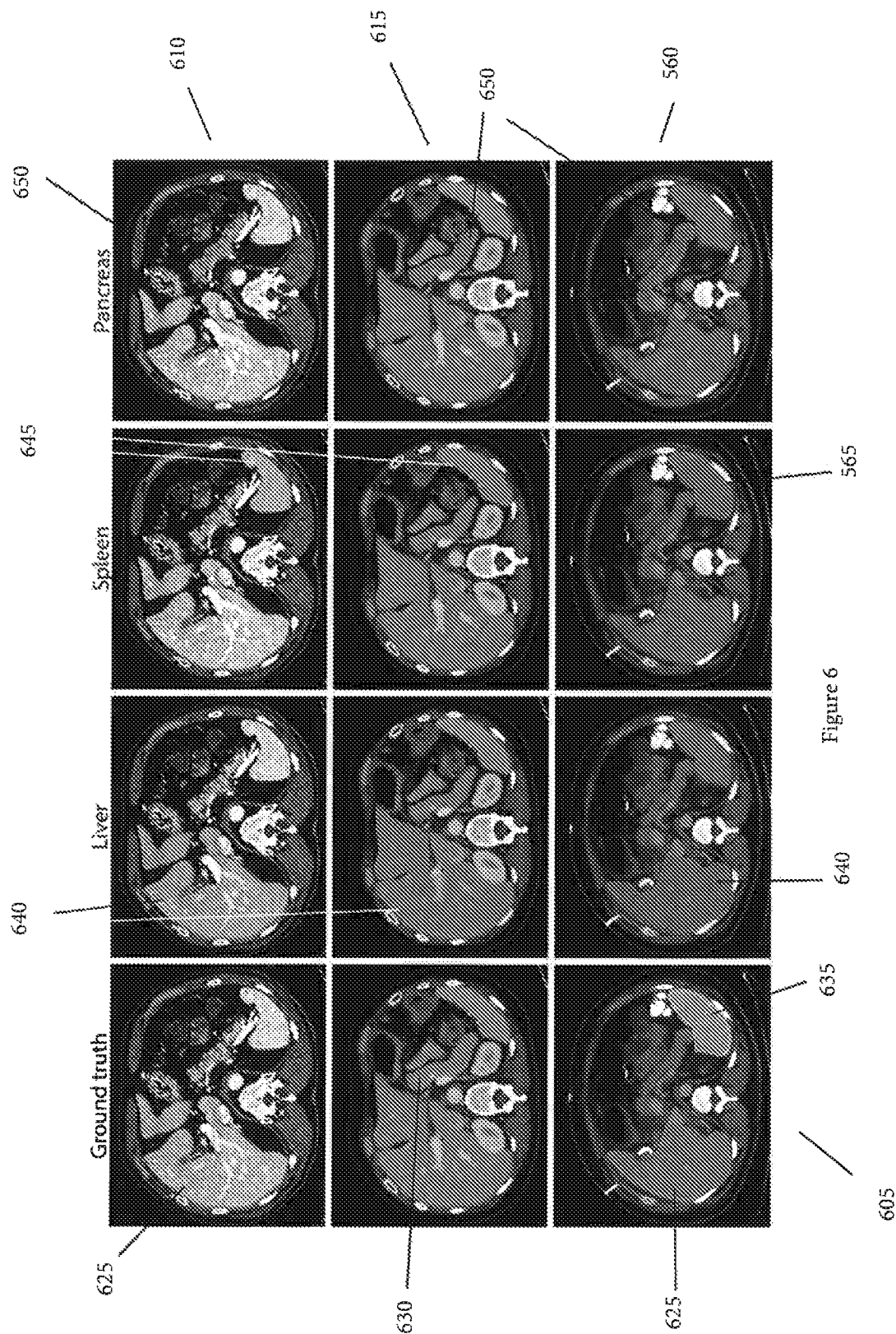
FIG. 6 is a set of segmentation results for CT images according to an exemplary embodiment of the present disclosure.

Further, conditioning the decoder part of the exemplary model was examined. This can be referred to as cond-dec. (See e.g., graphs shown in FIG. 4E). The learning curves illustrated in FIG. 4E illustrate a superior segmentation performance. The training in this experiment converges faster than in the other experiments. In addition to outperforming both meticulously tailored solutions for single-class segmentation and multi-class segmentation solutions designed on private datasets (see e.g., Table 1 below), the exemplary system, method and computer-accessible medium also shows significant generalization ability. Examples of the segmentation results for the con-dec experiment are illustrated in FIG. 6. The results are presented in 2D for illustrative purposes, but actual results are in 3D. Row 610 was produced using Silver07 dataset (see, e.g., Reference 15), row 615 was produced using a NIH Pancreas dataset (see, e.g., Reference 16), and row 620 was produced using a dataset of liver and spleen segmentations. Available ground truth are outlined in the datasets. Specifically, element 625 identifies the ground truth for the liver, element 630 identifies the ground truth for the pancreas, and element 635 identifies the ground truth for the spleen. Segmentation results conditioned on each $c_m \in C=\{$liver, spleen, pancreas$\}$ are shown. In particular, element 640 identifies the segmentation results for the liver, element 645 identifies the segmentation result for the spleen, and element 650 identifies the segmentation results for the pancreas. Although the segmentation outlines for the additional dataset are shown together, they were generated and stored separately in a form of binary masks.

Figure 7:
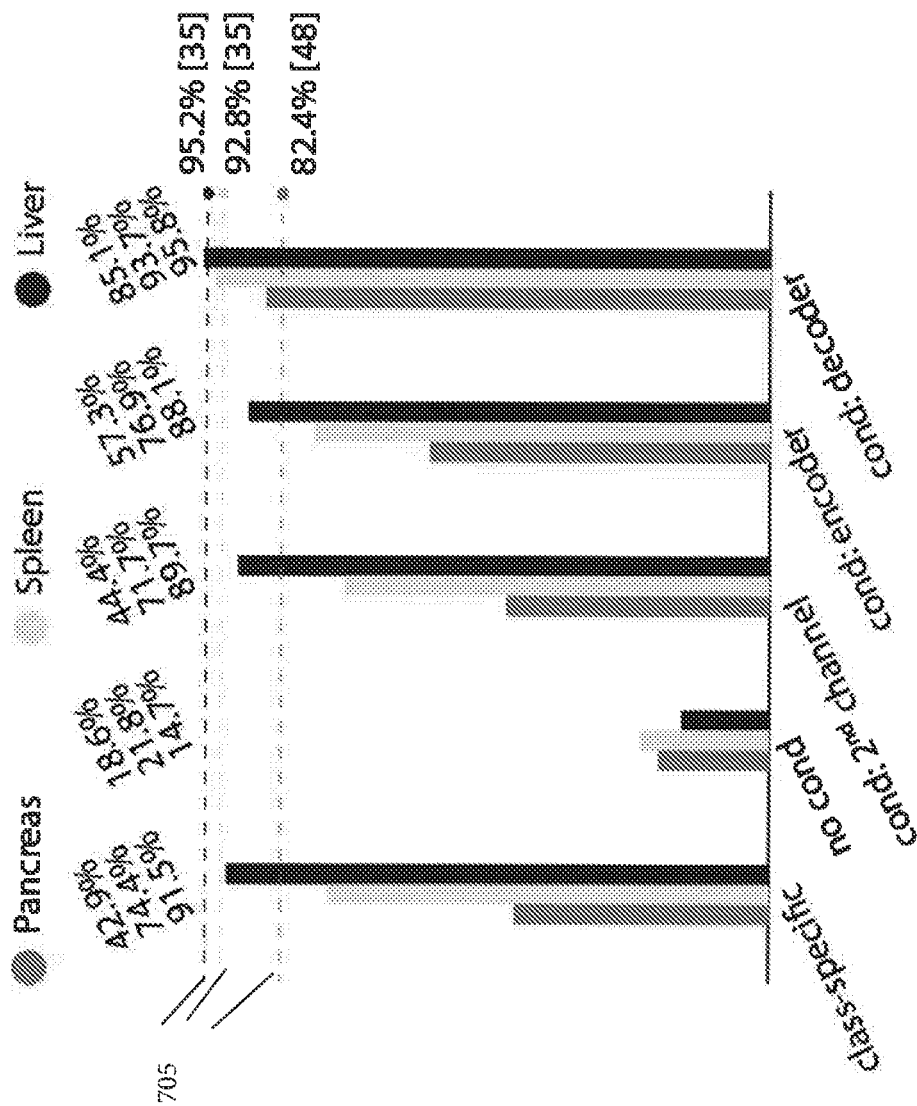
FIG. 7 is a set of graphs illustrating results for various condition models according to an exemplary embodiment of the present disclosure.

FIG. 7 is a set of graphs illustrating results for various condition models according to an exemplary embodiment of the present disclosure. In particular, FIG. 7 is a graph of the data shown below in Table 1, which illustrates comparative results depending on the location of conditioning, for example, as an input into the neural network, at the encoder stage, or at the decoder stage, etc. Dotted lines 605 illustrate a comparison of the exemplary model to levels obtained using comparable single class models. (See e.g., References 35 and 48).

It was observed that the exemplary model accurately delineates all the target objects even in a difficult case illustrated in FIG. 6 (e.g., row 620), where due to the imaging protocol all of the organs, besides being congested together, also have similar intensities and their boundaries can be hard to differentiate. The reason for such accurate segmentations by this model can be due to (i) a high degree of implicit parameter sharing between all classes being modeled, and (ii) the ability of the decoder path to capitalize on the available conditional information and gradually recover the spatial information and sharp boundaries of the target classes.

TABLE 1

The comparison of segmentation accuracy (mean DSC, %) for different models for the segmentation of liver, spleen, and pancreas (higher is better).

| Model | Liver | Spleen | Pancreas |
| --- | --- | --- | --- |
| Yang et al., (see, e.g., Reference 44) | 95.0 | — | — |
| Zhou et al., (see, e.g., Reference 48) | — | — | 82.4 |
| Roth et al., (see, e.g., Reference 35) | 95.2 | 92.8 | 82.2 |
| indivs | 91.5 | 74.4 | 42.9 |
| no cond | 14.7 | 21.8 | 18.6 |
| cond-2nd | 89.7 | 71.7 | 44.4 |
| cond-enc | 88.1 | 76.9 | 57.3 |
| cond-dec | 95.8 | 93.7 | 85.1 |

Figure 8:
FIG. 8 is an example of a corrupted imaged according to an exemplary embodiment of the present disclosure.

Importance of spatial connections between classes: To evaluate the spatial correlation between classes on the model's performance, cond-dec model was evaluated on corrupted images. For CT images in particular, the baseline performance, as shown in Table 1, was compared to the performance on images where different classes were corrupted by randomly replacing 70% of the corresponding voxels with intensity values common for fatty tissue between organs. An example of a corrupted image for spleen is illustrated in FIG. 8. The separate corruption of the spleen and pancreas classes had practically no effect on the accuracy of the liver segmentation, which only degraded within about a 2% range. However, both the segmentations of spleen and pancreas were significantly affected when other organs were corrupted, dropping the performance on average by 15.3% compared to the baseline. Thus, the exemplary model can learn and utilize the spatial correlations between target classes during the inference.

Figure 9A:
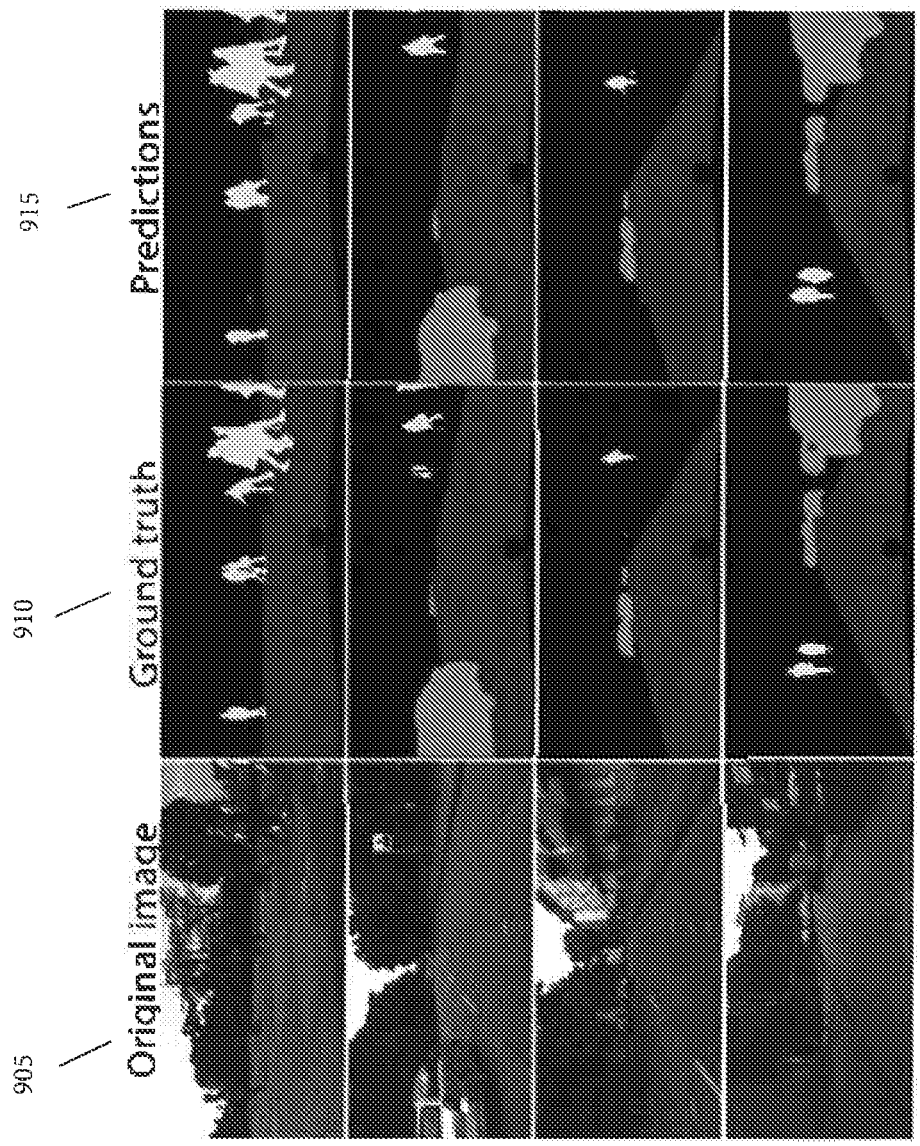
FIG. 9A is a set of images of cityscapes and the associated segmentation results according to an exemplary embodiment of the present disclosure.

Applicability to natural images: The exemplary system, method and computer-accessible medium, according to an exemplary embodiment of the present disclosure, can be used on a wide range of image types, and is not limited to medical imaging applications. To demonstrate the applicability of the exemplary system, method and computer-accessible medium to other domains, an exemplary model for semantic segmentation of natural images was trained. While datasets of natural images are generally multi-class, for example, multiple objects in an image can be annotated, the validation of the exemplary system, method and computer-accessible medium on natural images datasets can be valuable. Thus, as shown in FIG. 9A, the exemplary system, method and computer-accessible medium was evaluated using a challenging urban scene understanding dataset Cityscapes. In particular, FIG. 9A is a set of images of segmentation results of cityscapes, which includes original images 905, ground truth images 910, and the prediction results 915.

The dataset used to develop the segmentation of FIG. 9A contains 2,975 finely-annotated training, 500 validation, and 1,525 test images of 1024×2048 resolution with 19 semantic classes. Additionally, the dataset comes with 20,000 coarsely-annotated training images, although these were not used in this experiment. Three classes were selected: road, car, and person. To imitate single-class datasets, each multi-class annotation image was converted into a set of three binary masks. A base model was used with 2D convolutions and max-pooling layers, and only the decoder part of the model was conditioned. In addition, to test the sensitivity of the model to $c_m$ values, the lookup table was predefined with values sampled from [−20, 20]. Each image was resized to 512×1024, and the dataset was augmented with random left and right flips and brightness perturbations. The model was trained for 40K iterations using a mini-batch of 4 and a DSC-based loss function. The results were evaluated in terms of class-wise intersection over union ("IoU") metric for test images upsampled to the original resolution and are shown in Table 2 below. The exemplary model can achieve performance close to the state-of-the-art solutions (see, e.g., References 2, 3 and 47), on some classes, without pre-training or post-processing steps, and using only finely-annotated data. While updating the state-of-the-art on this dataset may not be necessary, given that it is a multi-class dataset, it can be beneficial to pre-train the exemplary model on datasets, such as Synthia (see, e.g., Reference 33), and using additional annotated data can improve the performance of the exemplary system, method and computer-accessible medium. (See, e.g., References 2, 3, 36 and 47).

TABLE 2

The comparison of segmentation accuracy (per class IoU, %) on Cityscapes test set for different classes (higher is better).

| Model | Road | Car | Person |
|---|---|---|---|
| Chen et al., (see, e.g., Reference 2) | 98.7 | 96.5 | 88.2 |
| Chen et al., (see, e.g., Reference 3) | 98.6 | 96.3 | 87.6 |
| Zhao et al., (see, e.g., Reference 47) | 98.7 | 96.2 | 86.8 |
| cond-dec | 96.4 | 91.0 | 76.2 |

Figure 9B:
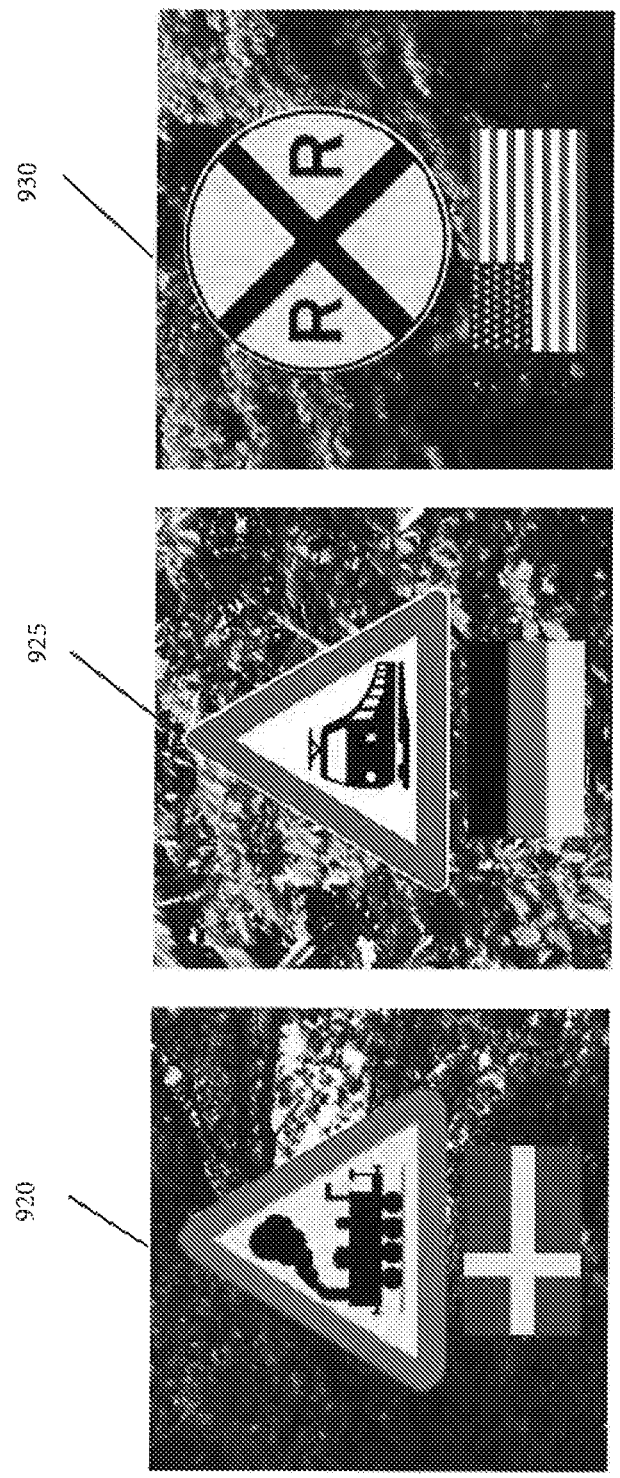
FIG. 9B is a set of images of signs that can be classified using the exemplary system, method and computer-accessible medium according to an exemplary embodiment of the present disclosure.

FIG. 9B shows a set of images of road signs that can be classified according to an exemplary embodiment of the present disclosure. For example, in addition to segmenting images (e.g., medical images, cityscapes, etc.) the exemplary system, method and computer-accessible medium can be used to classify objects in an image. In particular, FIG. 9B shows railroad signs for different countries: (i) Sweden identified by element 920, (ii) Germany identified by element 925, and (iii) the USA identified by element 930. The exemplary system, method and computer-accessible medium can be trained on single-class datasets that include signs for each country. An identification of the object to be classified (e.g., railroad sign), conditioned with the country of origin, can be used to train the exemplary model. Thus, after training, the exemplary system, method and computer-accessible medium, according to an exemplary embodiment of the present disclosure, can classify each railroad sign regardless of the country of origin.

Exemplary Model

Table 3 below shows details on the architecture of the exemplary model.

TABLE 3

Architecture details of the base model. 2D or 3D convolutional and transposed convolutional (TransConv) layers can be used, depending on the experiment. Each DenseBlock X →| N contained N densely connected convolutional layers with X filters each.

| | Input | |
|---|---|---|
| Encoder | Conv 2 | |
| | DenseBlock 16 x 3 + MaxPooling | |
| | DenseBlock 32 x 3 + MaxPooling | |
| | DenseBlock 64 x 3 + MaxPooling | |
| | DenseBlock 128 x 3 + MaxPooling | |
| | DenseBlock 256 x 3 + MaxPooling | |
| | DenseBlock 512 x 3 + MaxPooling | |
| | TransConv 512 + DenseBlock 256 x 3 | Decoder |
| | TransConv 256 + DenseBlock 128 x 3 | |
| | TransConv 128 + DenseBlock 64 x 3 | |
| | TransConv 64 + DenseBlock 32 x 3 | |
| | TransConv 32 + DenseBlock 16 x 3 | |
| | TransConv 16 + DenseBlock 8 x 3 | |
| | Conv 32 | |
| | Conv 1 | |
| | Output | |

As shown in Table 3, the exemplary model can include at least one convolutional layer, and at least six DenseBlock+MaxPooling layers. The combination of the convolutional and DenseBlock+MaxPooling layers can form a decoder used by the exemplary system, method and computer-accessible medium. As also shown in Table 3, the exemplary model can also include at least six TransConv+DenseBlock layers, and two convolutional layers.

Exemplary Discussion

The exemplary system, method and computer-accessible medium, according to an exemplary embodiment of the present disclosure, can be used to learn multi-class segmentations of 2D or 3D images from single-class datasets by conditioning a convnet for the purpose of multi-class segmentation. Experimental evaluations of the various ways of conditioning the model were performed, which determined that providing each layer in the decoder a direct access to the conditional information can yield the accurate segmentation results. The exemplary system, method and computer-accessible medium was evaluated on the task of segmentation of medical images, where the problem of single-class datasets naturally arises, but can be broadly applied to other multi-class segmentation applications. While being significantly more computationally efficient, the method outperforms current state-of-the-art solutions, which were specifically tailored for each single-class dataset. Additionally, the exemplary system, method and computer-accessible medium can be applied to the semantic segmentation of any images, such as natural images, using any exemplary dataset.

The exemplary system, method and computer-accessible medium, according to an exemplary embodiment of the present disclosure, can be used in various domains. In particular, the exemplary system, method and computer-accessible medium can be applied for the detection of cancer metastases in pathology images. Pathology datasets show similar fragmentation—a unified database of pathology images of various biological tissues, such as brain or breast, currently does not exist and research focuses on separate subproblems. Similarly to the exemplary experiments, a convnet can be conditioned on the target type of metastasized cancer cells in different tissue samples. The exemplary system, method and computer-accessible medium can be used for instance-level segmentation, where each instance can be conditioned on certain attributes, such as size, color, etc., or something more sophisticated, such as species or kind. Furthermore a method of learning data representations in multiple visual domains for the purpose of classification has been described. (See, e.g., Reference 31). The exemplary system, method and computer-accessible medium, according to an exemplary embodiment of the present disclosure, can be used to augment such works for the purpose of segmentation.

The exemplary system, method and computer-accessible medium, according to an exemplary embodiment of the present disclosure, can incorporate images from different domains. For example, multimodal radiological images (e.g., CT images, MRI images, etc.) can be used for training, and classes can be transferred between imaging modalities.

Figure 10:
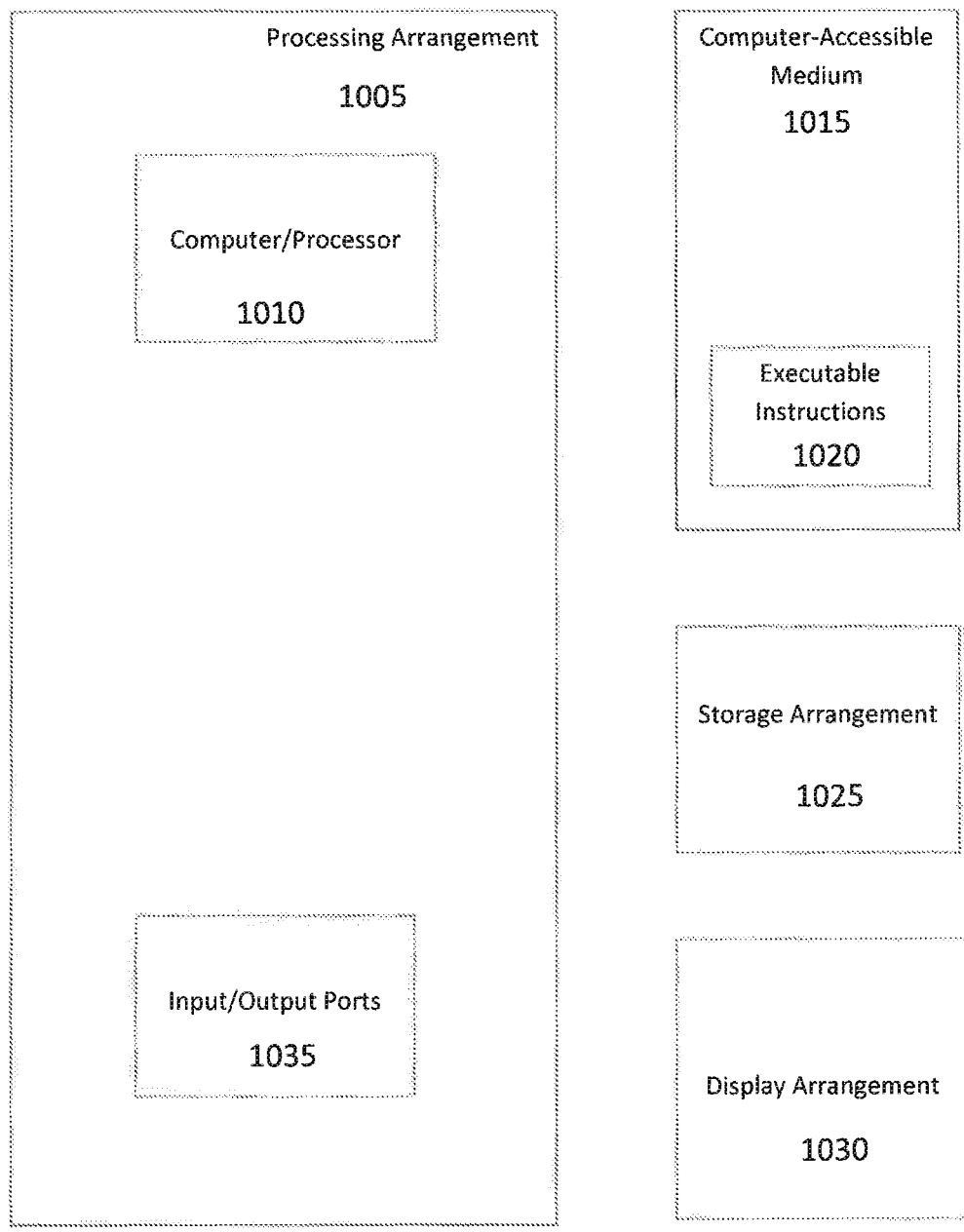
FIG. 10 is an illustration of an exemplary block diagram of an exemplary system in accordance with certain exemplary embodiments of the present disclosure.

FIG. 10 shows a block diagram of an exemplary embodiment of a system according to the present disclosure, which can be used to generate/model the multiclass model, and which can also be used to segment or classify images using an already generated/trained multiclass model. For example, exemplary procedures in accordance with the present disclosure described herein (e.g., the generating/training of the model, and the segmentation and classification using the generated/trained model) can be performed by a processing arrangement and/or a computing arrangement 1005. Such processing/computing arrangement 1005 can be, for example entirely or a part of, or include, but not limited to, a computer/processor 1010 that can include, for example one or more microprocessors, and use instructions stored on a computer-accessible medium (e.g., RAM, ROM, hard drive, or other storage device).

As shown in FIG. 10, for example a computer-accessible medium 1015 (e.g., as described herein above, a storage device such as a hard disk, floppy disk, memory stick, CD-ROM, RAM, ROM, etc., or a collection thereof) can be provided (e.g., in communication with the processing arrangement 1005). The computer-accessible medium 1015 can contain executable instructions 1020 thereon. In addition or alternatively, a storage arrangement 1010 can be provided separately from the computer-accessible medium 1015, which can provide the instructions to the processing arrangement 1005 so as to configure the processing arrangement to execute certain exemplary procedures, processes and methods, as described herein above, for example. Storage arrangement 1025, can also include the multiple single-class datasets can be used to generate/train the multiclass model. Additionally, storage arrangement 1025 can include the lookup table as described above, which can include information to condition the neural network (e.g., an identification of the target object to be segmented or classified) Storage arrangement 1025 can also include the target masks (e.g., segmentation masks or classification masks), which can be used to generate/train the model. Further, storage arrangement 1025 can include a plurality of storage arrangements, and the single-class datasets, the target masks, and the lookup tables can be stored in any combination on the multiple storage arrangements.

Further, the exemplary processing arrangement 1005 can be provided with or include an input/output arrangement 1035 (e.g., input/output ports), which can include, for example a wired network, a wireless network, the internet, an intranet, a data collection probe, a sensor, etc. Input/output arrangement 1035 can be used to communicate with one or more remote storage arrangements where the single-class datasets, the target masks, and the lookup tables can be stored. As shown in FIG. 10, the exemplary processing arrangement 1005 can be in communication with an exemplary display arrangement 1030, which, according to certain exemplary embodiments of the present disclosure, can be a touch-screen configured for inputting information to the processing arrangement in addition to outputting information from the processing arrangement, for example. Further, the exemplary display arrangement 1030 and/or a storage arrangement 1025 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties.

[1] Amy Bearman, Olga Russakovsky, Vittorio Ferrari, and Li Fei-Fei. Whats the point: Semantic segmentation with point supervision. Proc. of European Conference on Computer Vision (ECCV), pages 549-565, 2016.

[2] Liang-Chieh Chen, Maxwell D Collins, Yukun Zhu, George Papandreou, Barret Zoph, Florian Schroff, Hartwig Adam, and Jonathon Shlens. Searching for efficient multi-scale architectures for dense image prediction. arXiv preprint arXiv:1809.04184, 2018.

[3] Liang-Chieh Chen, George Papandreou, Florian Schroff, and Hartwig Adam. Rethinking atrous convolution for semantic image segmentation. arXiv preprint arXiv: 1706.05587, 2017.

[4] Chengwen Chu, Masahiro Oda, Takayuki Kitasaka, Kazunari Misawa, Michitaka Fujiwara, Yuichiro Hayashi, Yukitaka Nimura, Daniel Rueckert, and Kensaku Mon. Multi-organ segmentation based on spatially-divided probabilistic atlas from 3D abdominal CT images. Proc. of International Conference on Medical Image Computing and Computer-Assisted Intervention (MICCAI), pages 165-172, 2013.

[5] Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. Proc. of IEEE Conference on Computer Vision and Pattern Recognition (CVPR), pages 3213-3223, 2016.

[6] Jifeng Dai, Kaiming He, and Jian Sun. Boxsup: Exploiting bounding boxes to supervise convolutional networks for semantic segmentation. Proc. of IEEE International Conference on Computer Vision (ICCV), pages 1635-1643, 2015.

[7] Jia Deng, Wei Dong, Richard Socher, Li-Jia Li, Kai Li, and Li Fei-Fei. Imagenet: A large-scale hierarchical image database. Proc. of IEEE Conference on Computer Vision and Pattern Recognition (CVPR), pages 248-255, 2009.

[8] Emily L Denton, Soumith Chintala, and Rob Fergus. Deep generative image models using a laplacian pyramid of adversarial networks. Proc. of Advances in Neural Information Processing Systems (NIPS), pages 1486-1494, 2015.

[9] Konstantin Dmitriev, Arie E Kaufman, Ammar A Javed, Ralph H Hruban, Elliot K Fishman, Anne Marie Lennon, and Joel H Saltz. Classification of pancreatic cysts in computed tomography images using a random forest and convolutional neural network ensemble. Proc. of International Conference on Medical Image Computing and Computer-Assisted Intervention (MICCAI), pages 150-158, 2017.

[10] Qi Dou, Hao Chen, Yueming Jin, Lequan Yu, Jing Qin, and Pheng-Ann Heng. 3D deeply supervised network for automatic liver segmentation from CT volumes. Proc. of International Conference on Medical Image Computing and Computer-Assisted Intervention (MICCAI), pages 149-157, 2016.

[11] Michal Drozdzal, Gabriel Chartrand, Eugene Vorontsov, Mahsa Shaken, Lisa Di Jorio, An Tang, Adriana Romero, Yoshua Bengio, Chris Pal, and Samuel Kadoury. Learning normalized inputs for iterative estimation in medical image segmentation. Medical image analysis, 44:1-13, 2018.

[12] Mark Everingham, Luc Van Gool, Christopher K I Williams, John Winn, and Andrew Zisserman. The pascal visual object classes (voc) challenge. International Journal of Computer Vision, 88(2):303-338, 2010.

[13] Amal Farag, Le Lu, Holger R Roth, Jiamin Liu, Evrim Turk-bey, and Ronald M Summers. A bottom-up approach for pancreas segmentation using cascaded superpixels and (deep) image patch labeling. IEEE Transactions on Image Processing, 26(1):386-399, 2017.

[14] Michael Götz, Christian Weber, Brain Stieltjes, Klaus Maier-Hein, and K Maier. Learning from small amounts of labeled data in a brain tumor classification task. Proc. of Neural Information Processing Systems (NIPS), 2014.

[15] Tobias Heimann, Brain Van Ginneken, Martin A Styner, Yu-lia Arzhaeva, Volker Aurich, Christian Bauer, Andreas Beck, Christoph Becker, Reinhard Beichel, György Bekes, et al. Comparison and evaluation of methods for liver segmentation from CT datasets. IEEE Transactions on Medical Imaging, 28(8):1251-1265, 2009.

[16] Roth Holger, Farag Amal, Turkbey Evrim, Lu Le, Liu Ji-amin, and Summers Ronald. Data from pancreas-CT. Cancer Imaging Archive, 2016.

[17] Gao Huang, Zhuang Liu, Kilian Q Weinberger, and Laurens van der Maaten. Densely connected convolutional networks. Proc. of IEEE Conference on Computer Vision and Pattern Recognition (CVPR), 1(2):3, 2017.

[18] Zilong Huang, Xinggang Wang, Jiasi Wang, Wenyu Liu, and Jingdong Wang. Weakly-supervised semantic segmentation network with deep seeded region growing. Proc. of IEEE Conference on Computer Vision and Pattern Recognition (CVPR), pages 7014-7023, 2018.

[19] Simon Jégou, Michal Drozdzal, David Vazquez, Adriana Romero, and Yoshua Bengio. The one hundred layers tiramisu: Fully convolutional densenets for semantic segmentation. Proc. of IEEE Conference on Computer Vision and Pattern Recognition Workshops (CVPRW), pages 1175-1183, 2017.

[20] Oscar Jimenez-del Toro, Henning Mu¨ller, Markus Krenn, Katharina Gruenberg, Abdel Aziz Taha, Marianne Winter-stein, Ivan Eggel, Antonio Foncubierta-Rodriguez, Orcun Goksel, András Jakab, et al. Cloud-based evaluation of anatomical structure segmentation and landmark detection algorithms: VISCERAL anatomy benchmarks. IEEE Transactions on Medical Imaging, 35(11):2459-2475, 2016.

[21] Diederik P Kingma and Jimmy Ba. Adam: A method for stochastic optimization. arXiv preprint arXiv:1412.6980, 2014.

[22] Alexander Kolesnikov and Christoph H Lampert. Seed, expand and constrain: Three principles for weakly-supervised image segmentation. Proc. of European Conference on Computer Vision (ECCV), pages 695-711, 2016.

[23] Christoph Lassner, Gerard Pons-Moll, and Peter V Gehler. A generative model of people in clothing. arXiv preprint arXiv:1705.04098, 2017.

[24] Tsung-Yi Lin, Michael Maire, Serge Belongie, James Hays, Pietro Perona, Deva Ramanan, Piotr Dollar, and C Lawrence Zitnick. Microsoft COCO: Common objects in context. Proc. of European Conference on Computer Vision (ECCV), pages 740-755, 2014.

[25] Fang Lu, Fa Wu, Peijun Hu, Zhiyi Peng, and Dexing Kong. Automatic 3D liver location and segmentation via convolutional neural network and graph cut. International Journal of Computer Assisted Radiology and Surgery, 12(2):171-182, 2017.

[26] Ligian Ma, Xu Jia, Qianru Sun, Bernt Schiele, Tinne Tuyte-laars, and Luc Van Gool. Pose guided person image generation. Proc. of Advances in Neural Information Processing Systems (NIPS), pages 405-415, 2017.

[27] Andrew L. Maas, Awni Y. Hannun, and Andrew Y. Ng. Rectifier nonlinearities improve neural network acoustic models. Proc. of ICML Workshop on Deep Learning for Audio, Speech and Language Processing, 2013.

[28] Toshiyuki Okada, Marius George Linguraru, Masatoshi Hori, Ronald M Summers, Noriyuki Tomiyama, and Yoshi-nobu Sato. Abdominal multi-organ segmentation from CT images using conditional shape-location and unsupervised intensity priors. Medical Image Analysis, 26(1):1-18, 2015.

[29] Bruno Oliveira, Sandro Queirós, Pedro Morais, Helena R Torres, João Gomes-Fonseca, Jaime C Fonseca, and João L Vilaça. A novel multi-atlas strategy with dense deformation field reconstruction for abdominal and thoracic multi-organ segmentation from computed tomography. Medical Image Analysis, 45:108-120, 2018.

[30] George Papandreou, Liang-Chieh Chen, Kevin P Murphy, and Alan L Yuille. Weakly- and semi-supervised learning of a deep convolutional network for semantic image segmentation. Proc. of IEEE International Conference on Computer Vision (CVPR), pages 1742-1750, 2015.

[31] Sylvestre-Alvise Rebuffi, Hakan Bilen, and Andrea Vedaldi. Learning multiple visual domains with residual adapters. Proc. of Advances in Neural Information Processing Systems (NIPS), pages 506-516, 2017.

[32] Scott E Reed, Zeynep Akata, Santosh Mohan, Samuel Tenka, Bernt Schiele, and Honglak Lee. Learning what and where to draw. Proc. of Advances in Neural Information Processing Systems (NIPS), pages 217-225, 2016.

[33] German Ros, Laura Sellart, Joanna Materzynska, David Vazquez, and Antonio M Lopez. The synthia dataset: A large collection of synthetic images for semantic segmentation of urban scenes. Proc. of IEEE Conference on Computer Vision and Pattern Recognition (CVPR), pages 3234-3243, 2016.

[34] Holger R Roth, Le Lu, Amal Farag, Hoo-Chang Shin, Jiamin Liu, Evrim B Turkbey, and Ronald M Summers. Deeporgan: Multi-level deep convolutional networks for automated pancreas segmentation. Proc. of International Conference on Medical Image Computing and Computer-Assisted Intervention (MICCAI), pages 556-564, 2015.

[35] Holger R Roth, Hirohisa Oda, Yuichiro Hayashi, Masahiro Oda, Natsuki Shimizu, Michitaka Fujiwara, Kazunari Mi-sawa, and Kensaku Mon. Hierarchical 3D fully convolutional networks for multi-organ segmentation. arXiv preprint arXiv:1704.06382, 2017.

[36] Swami Sankaranarayanan, Yogesh Balaji, Arpit Jain, Ser Nam Lim, and Rama Chellappa. Learning from synthetic data: Addressing domain shift for semantic segmentation. Proc. of IEEE Conference on Computer Vision and Pattern Recognition (CVPR), 2018.

[37] Tong Shen, Guosheng Lin, Chunhua Shen, and Ian Reid. Bootstrapping the performance of webly supervised semantic segmentation. Proc. of the IEEE Conference on Computer Vision and Pattern Recognition (CVPR), pages 1363-1371, 2018.

[38] Aaron van den Oord, Nal Kalchbrenner, Lasse Espeholt, Oriol Vinyals, Alex Graves, and Koray Kavukcuoglu. Conditional image generation with pixelcnn decoders. Proc. of Advances in Neural Information Processing Systems (NIPS), pages 4790-4798, 2016.

[39] Xiaosong Wang, Yifan Peng, Le Lu, Zhiyong Lu, and Ronald M Summers. Tienet: Text-image embedding network for common thorax disease classification and reporting in chest x-rays. Proc. of the IEEE Conference on Computer Vision and Pattern Recognition (CVPR), pages 9049-9058, 2018.

[40] Robin Wolz, Chengwen Chu, Kazunari Misawa, Kensaku Mon, and Daniel Rueckert. Multi-organ abdominal CT segmentation using hierarchically weighted subject-specific atlases. Proc. of International Conference on Medical Image Computing and Computer-Assisted Intervention (MICCAI), pages 10-17, 2012.

[41] Jia Xu, Alexander G Schwing, and Raquel Urtasun. Learning to segment under various forms of weak supervision. Proc. of IEEE Conference on Computer Vision and Pattern Recognition (CVPR), pages 3781-3790, 2015.

[42] Tianfan Xue, Jiajun Wu, Katherine Bouman, and Bill Freeman. Visual dynamics: Probabilistic future frame synthesis via cross convolutional networks. Proc. of Advances in Neural Information Processing Systems (NIPS), pages 91-99, 2016.

[43] Xinchen Yan, Jimei Yang, Kihyuk Sohn, and Honglak Lee. Attribute2image: Conditional image generation from visual attributes. Proc. of European Conference on Computer Vision (ECCV), pages 776-791, 2016.

[44] Dong Yang, Daguang Xu, S Kevin Zhou, Bogdan Georgescu, Mingqing Chen, Sasa Grbic, Dimitris Metaxas, and Dorm Comaniciu. Automatic liver segmentation using an adversarial image-to-image network. Proc. of International Conference on Medical Image Computing and Computer-Assisted Intervention (MICCAI), pages 507-515, 2017.

[45] Qihang Yu, Lingxi Xie, Yan Wang, Yuyin Zhou, Elliot K. Fishman, and Alan L. Yuille. Recurrent saliency transformation network: Incorporating multi-stage visual cues for small organ segmentation. Proc. of IEEE Conference on Computer Vision and Pattern Recognition (CVPR), June 2018.

[46] Zizhao Zhang, Lin Yang, and Yefeng Zheng. Translating and segmenting multimodal medical volumes with cycle- and shapeconsistency generative adversarial network. Proc. of the IEEE Conference on Computer Vision and Pattern Recognition (CVPR), pages 9242-9251, 2018.

[47] Hengshuang Zhao, Jianping Shi, Xiaojuan Qi, Xiaogang Wang, and Jiaya Jia. Pyramid scene parsing network. Proc. of IEEE Conference on Computer Vision and Pattern Recognition (CVPR), pages 2881-2890, 2017.

[48] Yuyin Zhou, Lingxi Xie, Wei Shen, Yan Wang, Elliot K Fishman, and Alan L Yuille. A fixed-point model for pancreas segmentation in abdominal CT scans. Proc. of International Conference on Medical Image Computing and Computer-Assisted Intervention (MICCAI), pages 693-701, 2017.

[49] Jun-Yan Zhu, Richard Zhang, Deepak Pathak, Trevor Darrell, Alexei A Efros, Oliver Wang, and Eli Shechtman. Toward multimodal image-to-image translation. Proc. of Advances in Neural Information Processing Systems (NIPS), pages 465-476, 2017.

What is claimed is:

1. A non-transitory computer-accessible medium having stored thereon computer-executable instructions for generating at least one multiclass image segmentation model, wherein, when a computer arrangement executes the instructions, the computer arrangement is configured to perform procedures comprising:
receiving multiple single-class image datasets;
receiving a target mask for each of the single-class image datasets;
receiving a condition of an object associated with each of the single-class image datasets; and
generating the at least one multiclass image segmentation model based on the single-class image datasets, the target masks, and the identification of the target objects.

2. The computer-accessible medium of claim 1, wherein the single-class image datasets include computer tomography images of abdominal organs.

3. The computer-accessible medium of claim 1, wherein the single-class image datasets are non-overlapping single-class image datasets.

4. The computer-accessible medium of claim 1, wherein the condition includes at least one of (i) an identification of a target object associated with each image in each single-class image dataset, (ii) a classification of each image associated with each single-class image dataset or (iii) an identifiable detail regarding each image in each single-class image datasets.

5. The computer-accessible medium of claim 1, wherein the target mask is a segmentation mask.

6. The computer-accessible medium of claim 1, wherein the computer arrangement is configured to generate the at least one multiclass image segmentation model using at least one convolutional neural network (CNN).

7. The computer-accessible medium of claim 6, wherein the computer arrangement is configured to generate the at least one multiclass image segmentation model using the condition in an encoder stage of the at least one CNN.

8. The computer-accessible medium of claim 6, wherein the computer arrangement is configured to generate the at least one multiclass image segmentation model using the condition in a decoder stage of the at least one CNN.

9. The computer-accessible medium of claim 1, wherein the computer arrangement is configured to generate the at least one multiclass image segmentation model by training the at least one multiclass image segmentation model separately on (i) each class of the single-class image datasets, (ii) the target mask associated with each of the single-class image datasets, and (iii) the condition associated with each of the single-class image datasets.

10. The computer-accessible medium of claim 1, wherein the computer arrangement is further configured to:
receive a further single-class image dataset;
receive a further target mask for the further single-class image dataset;
receive a further condition associated with the further single-class image dataset; and
update the at least one multiclass image segmentation model based on the further single- class image dataset, the further target mask, and the further condition.

11. A system for generating at least one multiclass image segmentation model, comprising:
a computer hardware arrangement configured to:
receive multiple single-class image datasets;
receive a target mask for each of the single-class image datasets;
receive a condition of an object associated with each of the single-class image datasets; and
generate the at least one multiclass image segmentation model based on the single-class image datasets, the target masks, and the identification of the target objects.

12. The system of claim 11, wherein the single-class image datasets include medical imaging datasets or cityscape datasets.

13. The system of claim 11, wherein the condition includes at least one of (i) an identification of a target object associated with each image in each single-class image dataset, (ii) a classification of each image associated with each single-class image dataset or (iii) an identifiable detail regarding each image in each single-class image datasets.

14. The system of claim 11, wherein the target mask is a segmentation mask.

15. The system of claim 11, wherein the computer hardware arrangement is configured to generate the at least one multiclass image segmentation model by training the at least one multiclass image segmentation model separately on (i) each class of the single-class image datasets, (ii) the target mask associated with each of the single-class image datasets, and (iii) the condition associated with each of the single-class image datasets.

16. The system of claim 11, wherein the computer hardware arrangement is further configured to:
receive a further single-class image dataset;
receive a further target mask for the further single-class image dataset;
receive a further condition associated with the further single-class image dataset; and
update the at least one multiclass image segmentation model based on the further single-class image dataset, the further target mask, and the further condition.

17. A method for generating at least one multiclass image segmentation model, comprising:
receiving multiple single-class image datasets;
receiving a target mask for each of the single-class image datasets;
receiving a condition of an object associated with each of the single-class image datasets; and
using a computer arrangement, generating the at least one multiclass image segmentation model based on the single-class image datasets, the target masks, and the identification of the target objects.

18. The method of claim 17, wherein the condition includes at least one of (i) an identification of a target object associated with each image in each single-class image dataset, (ii) a classification of each image associated with each single-class image dataset or (iii) an identifiable detail regarding each image in each single-class image datasets.

19. The method of claim 17, further comprising generating the at least one multiclass image segmentation model by training the at least one multiclass image segmentation model separately on (i) each class of the single-class image datasets, (ii) the target mask associated with each of the single-class image datasets, and (iii) the condition associated with each of the single-class image datasets.

20. The method of claim 17, further comprising:
receiving a further single-class image dataset;
receiving a further target mask for the further single-class image dataset;
receiving a further condition associated with the further single-class image dataset; and
updating the at least one multiclass image segmentation model based on the further single-class image dataset, the further target mask, and the further condition.

* * * * *